(12) United States Patent
Yamaguchi et al.

(10) Patent No.: US 11,029,622 B2
(45) Date of Patent: Jun. 8, 2021

(54) DEVELOPER CARRYING MEMBER, PROCESS CARTRIDGE, AND ELECTROPHOTOGRAPHIC APPARATUS

(71) Applicant: CANON KABUSHIKI KAISHA, Tokyo (JP)

(72) Inventors: Sosuke Yamaguchi, Chiba (JP); Minoru Ito, Suntou-gun (JP); Takashi Koyanagi, Mishima (JP); Takahiro Miyazawa, Numazu (JP); Shohei Urushihara, Mishima (JP); Kentarou Nakamura, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/809,353

(22) Filed: Mar. 4, 2020

(65) Prior Publication Data

US 2020/0199402 A1 Jun. 25, 2020

Related U.S. Application Data

(63) Continuation of application No. PCT/JP2018/032557, filed on Sep. 3, 2018.

(30) Foreign Application Priority Data

Sep. 11, 2017 (JP) .............................. JP2017-174414
Apr. 26, 2018 (JP) .............................. JP2018-085817

(51) Int. Cl.
| | | |
|---|---|---|
| G03G 15/08 | (2006.01) | |
| G03G 21/18 | (2006.01) | |
| C08G 18/10 | (2006.01) | |
| C08G 18/42 | (2006.01) | |
| C08G 18/44 | (2006.01) | |

(Continued)

(52) U.S. Cl.
CPC ......... *G03G 15/0808* (2013.01); *C08G 18/10* (2013.01); *C08G 18/4238* (2013.01); *C08G 18/44* (2013.01); *C08G 18/7621* (2013.01); *C08G 18/7664* (2013.01);
(Continued)

(58) Field of Classification Search
CPC ............. G03G 9/0825; G03G 9/08795; G03G 9/08797; G03G 9/09364; G03G 9/09716; G03G 9/132; G03G 15/0808; G03G 15/1605; G03G 21/18; G03G 21/1814
USPC ........ 399/107, 110, 111, 119, 252, 265, 279, 399/286
See application file for complete search history.

(56) References Cited

U.S. PATENT DOCUMENTS 6,154,625 A * 11/2000 Saiki ................ G03G 15/0928
399/276
9,442,416 B2 9/2016 Magome
(Continued)

FOREIGN PATENT DOCUMENTS

| JP | 57-5047 A | 1/1982 |
|---|---|---|
| JP | 11-24386 A | 1/1999 |

(Continued)

*Primary Examiner* — Hoan H Tran
(74) *Attorney, Agent, or Firm* — Canon U.S.A., Inc., IP Division

(57) ABSTRACT

Provided is a developer carrying member that enables stable formation of images of high quality even on recording paper having a high talc content. The developer carrying member includes a conductive base member and a surface layer, wherein the surface layer includes a urethane resin, and the urethane resin has a carbonate bond and a tertiary amine structure.

13 Claims, 4 Drawing Sheets

(51) Int. Cl.
  *C08G 18/76* (2006.01)
  *C09D 175/06* (2006.01)

(52) U.S. Cl.
  CPC ....... *C08G 18/7671* (2013.01); *C09D 175/06* (2013.01); *G03G 21/1814* (2013.01)

(56) References Cited

U.S. PATENT DOCUMENTS

| | | |
|---|---|---|
| 9,625,854 B2 | 4/2017 | Koyanagi |
| 9,665,028 B2 | 5/2017 | Arimura |
| 2002/0111259 A1 | 8/2002 | Chiang |
| 2008/0070147 A1 | 3/2008 | Uchino |
| 2017/0060007 A1 | 3/2017 | Yamada |

FOREIGN PATENT DOCUMENTS

| | | |
|---|---|---|
| JP | 11-160998 A | 6/1999 |
| JP | 2012181367 A | 9/2012 |
| JP | 2013-50715 A | 3/2013 |
| JP | 2014-29496 A | 2/2014 |
| JP | 2015-125283 A | 7/2015 |
| JP | 2015-125330 A | 7/2015 |

\* cited by examiner

DEVELOPER CARRYING MEMBER, PROCESS CARTRIDGE, AND ELECTROPHOTOGRAPHIC APPARATUS

CROSS-REFERENCE TO RELATED APPLICATIONS

This application is a Continuation of International Patent Application No. PCT/JP2018/032557, filed Sep. 3, 2018, which claims the benefit of Japanese Patent Applications No. 2017-174414, filed Sep. 11, 2017 and No. 2018-085817, filed Apr. 26, 2018, all of which are hereby incorporated by reference herein in their entirety.

TECHNICAL FIELD

The present disclosure relates to a developer carrying member used in an electrophotographic apparatus, and a process cartridge and an electrophotographic apparatus that include the developer carrying member.

BACKGROUND ART

In an electrophotographic image-forming apparatus (such as an electrophotographic-mode copier, facsimile, or printer), an electrophotographic photoconductor (hereafter, also referred to as "photoconductor") is charged with a charging roller, and exposed, which results in formation of an electrostatic latent image on the photoconductor. Subsequently, toner in a development container is applied onto, with a toner supply roller and a toner regulating member, a developer carrying member. Subsequently, the developer carrying member conveys the toner to the development region. With the toner having been conveyed to the development region, the electrostatic latent image on the photoconductor is developed at a photoconductor-developer carrying member region or its proximity region. Subsequently, the toner on the photoconductor is transferred onto recording paper by a transfer unit, and fixed with heat and pressure; the toner remaining on the photoconductor is removed with a cleaning blade.

As the developer carrying member, in order to provide a higher capability of imparting charges to toner, a developer carrying member has been proposed that has a surface layer including a resin including a quaternary ammonium base or a tertiary amine group (Patent Literature 1 and Patent Literature 2).

CITATION LIST

Patent Literature

PTL 1: Japanese Patent Laid-Open No. 2013-50715
PTL 2: Japanese Patent Laid-Open No. 2014-29496

In recent years, various papers have been used for electrophotographic image-forming apparatuses. Among such papers, there are papers including, as filler, a large amount of an inorganic compound such as talc ($Mg_3Si_4O_{10}(OH)_2$).

When such a paper having a high talc content is used for forming electrophotographic images, the electrophotographic images have fogging in some cases.

Accordingly, an aspect of the present disclosure is directed to providing a developer carrying member that enables stable formation of electrophotographic images of high quality even on various papers.

Another aspect of the present disclosure is directed to providing an electrophotographic apparatus configured to stably output electrophotographic images of high quality. Still another aspect of the present disclosure is directed to providing a process cartridge that contributes to formation of electrophotographic images of high quality.

SUMMARY OF INVENTION

According to one aspect of the present disclosure, there is provided
a developer carrying member including a base member and a surface layer,
wherein the surface layer includes a urethane resin, and the urethane resin has a carbonate bond and includes a tertiary amine structure.

According to another aspect of the present disclosure, there is provided
a developer carrying member including a base member, an elastic layer on the base member, and a surface layer on the elastic layer, wherein the surface layer includes a urethane resin,
the urethane resin has a carbonate bond in the molecule thereof, and has a moiety derived from a reaction between an amino compound represented by Structural formula (2) below and polyisocyanate:

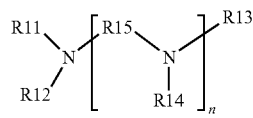

Structural formula (2)

[In Structural formula (2), R15 represents a linear or branched alkylene group having 2 or more and 4 or less carbon atoms, n is an integer of 0 or more and 4 or less; when n is 2 or more and 4 or less, a plurality of R15 are each independently defined as above,
when n is 0, R11 to R13 are each independently selected from (a2), (b), (c), and (d) below,
R11 to R14 in a case where n is 1 and R11 to R13 and a plurality of R14 in a case where n is 2 or more and 4 or less are each independently selected from (a1), (a2), (b), (c), and (d) below,
provided that, when n is 1, R11 to R14 are each selected from (b) to (d) below,
when n is 2 or more and 4 or less, at least four of R11 to R13 and two to four R14 are selected from (b) to (d) below:
   (a1) a hydrogen atom
   (a2) a linear or branched alkyl group having 1 to 4 carbon atoms;
   (b) a linear or branched hydroxyalkyl group having 1 or more and 8 or less carbon atoms;
   (c) a linear or branched aminoalkyl group having 2 or more and 8 or less carbon atoms; and
   (d) a group represented by Structural formula (3) below:

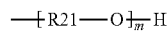

Structural formula (3)

[in Structural formula (3), m is 2 or 3, and a plurality of R21 each independently represent a linear or branched alkylene group having 2 or more and 5 or less carbon atoms]].

According to another aspect of the present disclosure, there is provided a process cartridge configured to be detachably attached to a main body of an electrophotographic apparatus, the process cartridge at least including: a toner container including toner, and a developer carrying member conveying the toner, wherein the developer carrying member is any one of the above-described developer carrying members.

According to still another aspect of the present disclosure, there is provided an electrophotographic apparatus at least including: an electrophotographic photoconductor; a charging member disposed so as to be configured to charge the electrophotographic photoconductor; and a developer carrying member supplying toner to the electrophotographic photoconductor, wherein the developer carrying member is any one of the above-described developer carrying members.

Further features of the present disclosure will become apparent from the following description of exemplary embodiments with reference to the attached drawings.

DESCRIPTION OF EMBODIMENTS

Figure 1A:
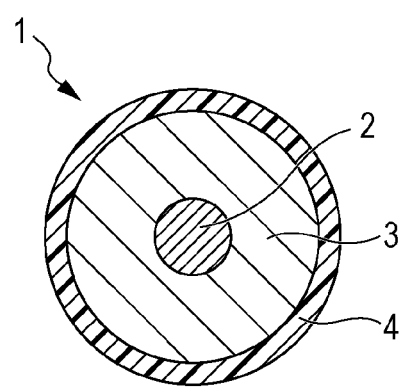
FIG. 1A is a schematic view of an example of a developer carrying member according to the present disclosure.

The inventors of the present disclosure have inferred that, when electrophotographic images are formed on paper having a high talc content, the electrophotographic images have fogging for the following reason.

In the case of forming electrophotographic images on paper having a high talc content (hereafter, referred to as "talc paper"), talc included in the paper adheres to the surface of the electrophotographic photoconductor (hereafter, also referred to as "photoconductor") during the step of forming electrophotographic images in some cases.

Of talc adhering to the surface of the electrophotographic photoconductor, talc particles having small sizes pass through the cleaning region for the electrophotographic photoconductor, to reach a region where the developer carrying member and the photoconductor face each other. Talc is highly likely to be negatively charged, compared with toner. Thus, on the developer carrying member, talc assumes stronger negative charges than toner, and electrostatically adheres to the surface of the developer carrying member, to thereby reduce the developer carrying member's capability of imparting charges to the toner. As a result, the toner does not assume charges sufficient for electrostatic transfer; such toner having an insufficient charging amount, which is not supposed to be transferred, is transferred onto the surface of the photoconductor, which results in fogging. Hereafter, such fogging will also be referred to as "talc derived fogging".

In particular, as described in PTL 1 and PTL 2, the developer carrying members having an enhanced capability of imparting charges to toner cause serious talc derived fogging. This is inferred that such developer carrying members cause talc to have very large charging amounts.

Thus, the inventors of the present disclosure performed thorough studies for the purpose of obtaining a developer carrying member configured to dissipate charges from talc having large accumulated charges, but configured to impart appropriate charges to toner.

As a result, the inventors have found that the purpose is effectively achieved with a developer carrying member comprising a surface layer containing a urethane resin, wherein the urethane resin has a carbonate bond in the molecule thereof and has a tertiary amine structure.

Specific examples of the urethane resin include a urethane resin having a moiety represented by the following Structural formula (1) in the molecule thereof.

Structural formula (1)

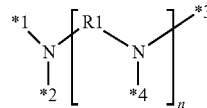

In Structural formula (1), R1 represents a linear or branched alkylene group having 2 or more and 4 or less carbon atoms, n is an integer of 0 or more and 4 or less; when n is 2 or more and 4 or less, a plurality of R1 are each independently defined as above, when n is 0, symbols "*1", "*2", and "*3" each independently represent a bonding point for a linear or branched alkyl group having 1 to 4 carbon atoms, or a bonding point for the polymer chain of the urethane resin, when n is 1 or more and 4 or less, symbols "*1", "*2", "*3", and "*4" each independently represent a bonding point for a hydrogen atom, a bonding point for a linear or branched alkyl group having 1 to 4 carbon atoms, or a bonding point for the polymer chain of the urethane resin; when n is 2 or more and 4 or less, a plurality of "*4" are each independently defined as above, provided that, when n is 1, "*1", "*2", "*3", and "*4" are all bonding points for the polymer chain of the urethane resin, and when n is 2 or more and 4 or less, at least four selected from "*1", "*2", "*3", and a plurality of "*4" are bonding points for the polymer chain of the urethane resin.

The urethane resin may have, for example, a moiety derived from a reaction between an amino compound represented by the following Structural formula (2) and polyisocyanate.

Structural formula (2)

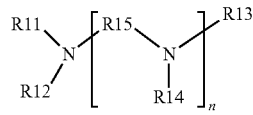

In Structural formula (2), R15 represents a linear or branched alkylene group having 2 or more and 4 or less carbon atoms, n is an integer of 0 or more and 4 or less; when n is 2 or more and 4 or less, a plurality of R15 are each independently defined as above, when n is 0, R11 to R13 are each independently selected from the following (a2), (b), (c), and (d), R11 to R14 in a case where n is 1 and R11 to R13 and a plurality of R14 in a case where n is 2 or more and 4 or less are each independently selected from the following (a1), (a2), (b), (c), and (d), provided that, when n is 1, R11 to R14 are all selected from the following (b) to (d), when n is 2 or more and 4 or less, at least four of R11 to R13 and two to four R14 are selected from the following (b) to (d):

(a1) a hydrogen atom (a2) a linear or branched alkyl group having 1 to 4 carbon atoms;

(b) a linear or branched hydroxyalkyl group having 1 or more and 8 or less carbon atoms;

(c) a linear or branched aminoalkyl group having 2 or more and 8 or less carbon atoms; and (d) a group represented by the following Structural formula (3):

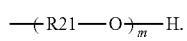

Structural formula (3)

In Structural formula (3), m is 2 or 3. A plurality of R21 each independently represent a linear or branched alkylene group having 2 or more and 5 or less carbon atoms.

Such a developer carrying member enables dissipation of charges from talc having accumulated negative charges, and enables imparting of appropriate negative charges to toner. The reason for this has not been clarified yet, but is inferred as follows.

Specifically, the urethane resin of the surface layer includes a carbonate bond. The carbonate bond has a single carbon atom and three adjacent oxygen atoms. Since the oxygen atoms have a higher electronegativity than the carbon atom, the carbon atom has a lowered electron density, so that the carbonate bond is a functional group that tends to accept electrons (electron-accepting functional group). Thus, negative charges of talc flow to the surface layer, which results in a decrease in the negative charges of talc. As a result, talc electrostatically adhering to the developer carrying member becomes more likely to separate; this results in a decrease in the amount of talc on the developer carrying member, which achieves restoration of the frequency of contact between the developer carrying member and toner.

The urethane resin includes a tertiary amine structure having an unshared electron pair. The unshared electron pair is rich in electrons, and hence behaves as an electron-donating functional group. This results in imparting of appropriate charges to toner. Incidentally, carbonate bonds may be considered as also causing leakage of negative charges of toner; however, experiments performed by the inventors of the present disclosure have demonstrated that the charging amount of toner is not considerably affected by the presence of carbonate bonds in the urethane resin. From the experimental results, the following is inferred: when the amount of negative charges of particles on the surface of the developer carrying member exceeds a certain threshold, carbonate bonds act to receive charges from the particles by an unclarified mechanism.

Figure 1B:
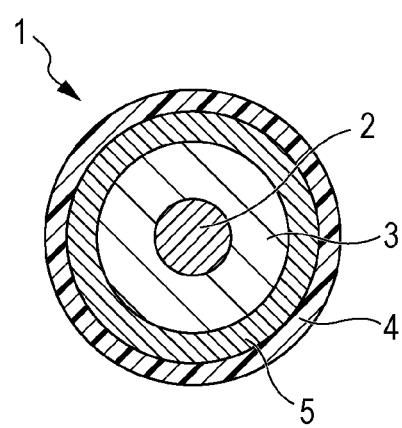
FIG. 1B is a schematic view of an example of a developer carrying member according to the present disclosure.

FIGS. 1A and 1B each illustrate a sectional view (in a direction orthogonal to the axis direction) of a roller-shaped developer carrying member according to an embodiment of the present disclosure (hereafter, also referred to as "developing roller").

As illustrated in FIG. 1A, a developing roller 1 includes a base member 2 having the shape of a solid cylinder or a hollow cylinder, and a surface layer 4, and further optionally includes an elastic layer 3 between the base member 2 and the surface layer 4. In other words, this developing roller includes a base member, an optional elastic layer on the base member, and a surface layer on the elastic layer.

As illustrated in FIG. 1B, the developing roller 1 may have another configuration such as a trilayer structure in which an intermediate layer 5 is disposed between the elastic layer 3 and the surface layer 4, or a multilayered configuration in which a large number of intermediate layers 5 are disposed between the elastic layer 3 and the surface layer 4. Such intermediate layers may be publicly known intermediate layers for developer carrying members.

Base Member

The base member functions as an electrode and support member of the developer carrying member, and is formed of, for example, a metal or alloy such as aluminum, copper alloy, or stainless steel; iron plated with chromium or nickel; or a conductive material such as a conductive synthetic resin. The base member may be solid or hollow.

Elastic Layer

The optional elastic layer imparts, upon contact of the developer carrying member with another member such as a photoconductor or a developer regulating blade, elasticity to the developer carrying member in order to facilitate formation of a nip having a predetermined width.

Examples of the material for forming the elastic layer include materials publicly known as being used for elastic layers and materials usable for elastic layers. Ordinarily, the elastic layer is preferably formed of a molded member of rubber material. Examples of the rubber material include the following:

ethylene-propylene-diene copolymer rubber (EPDM), acrylonitrile-butadiene rubber (NBR), chloroprene rubber (CR), natural rubber (NR), isoprene rubber (IR), styrene-butadiene rubber (SBR), fluororubber, silicone rubber, epichlorohydrin rubber, hydrogenated NBR, and urethane rubber.

These may be used alone or in combination of two or more thereof.

Of these, in particular, silicone rubber is preferred because the elastic layer is less likely to have compression set even after being in contact with another member for a long time. Examples of the silicone rubber include cured products of addition-cure silicone rubbers. In particular, preferred are cured products of addition-cure dimethylsilicone rubber.

The elastic layer 3 is formed so as to appropriately include various additives such as a conductivity imparting agent, a non-conductive filler, a crosslinking agent, and a catalyst. The conductivity imparting agent may be fine particles of carbon black; a conductive metal such as aluminum or copper; or a conductive metal oxide such as zinc oxide, tin oxide, or titanium oxide. At least one of these may be used. Of these, carbon black is particularly preferred because it is relatively easily available, and provides high conductivity. When carbon black is used as the conductivity imparting agent, 2 parts by mass or more and 50 parts by mass or less of carbon black is preferably added relative to 100 parts by mass of the rubber material in the materials for forming the elastic layer.

Examples of the non-conductive filler include silica, quartz powder, titanium oxide, zinc oxide, and calcium carbonate. At least one of these may be used.

Examples of the crosslinking agent include di-t-butyl peroxide, 2,5-dimethyl-2,5-di(t-butylperoxy)hexane, and dicumyl peroxide. At least one of these may be used.

Surface Layer

The surface layer is a resin layer including a urethane resin. The urethane resin has a carbonate bond in the molecule thereof, and has a tertiary amine structure.

As described above, such a surface layer has the following functions: carbonate bonds of the urethane resin in the surface layer achieve leakage of excess negative charges of talc, and the tertiary amine structure supplies appropriate negative charges to toner.

The urethane resin preferably has the moiety represented by Structural formula (1) in order to obtain anti-talc derived fogging performance. This is because the following effects exhibited are highly balanced: the effect of achieving leakage of excess negative charges from talc due to carbonate bonds and the effect of imparting appropriate negative charges to toner.

In the urethane resin, the concentration of carbonate bonds relative to the mass of the urethane resin is preferably 14.0 mass % or more and 23.0 mass % or less. This is because leakage of excess negative charges of talc can be further achieved.

The concentration of nitrogen atoms of the tertiary amine structure relative to the mass of the urethane resin is preferably 1.0 mass % or more and 3.0 mass % or less. This is because the capability of imparting negative charges to toner is made more appropriate.

Carbonate Bond

Such a carbonate bond can be made present between two adjacent urethane bonds in the urethane resin. When one or both of polyol and polyisocyanate serving as starting materials for the urethane resin have a carbonate bond, the resultant urethane resin has a carbonate bond in the molecule thereof.

The urethane resin preferably has a structure having a carbonate bond and represented by the following Structural formula (4) from the viewpoint of preventing talc derived fogging. The reason for this is inferred as follows.

The structure represented by Structural formula (4) has alkylene groups around the carbonate bond. Thus, the surrounding alkylene groups lower the crystallinity around the carbonate bond, which increases the mobility of the carbonate bond. This facilitates leakage of charges from excessively charged talc through the surface of the developer carrying member, so that talc becomes less likely to adhere to the surface, which inferentially provides better results in terms of talc derived fogging.

Structural formula (4)

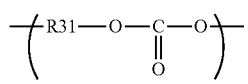

In Structural formula (4), R31 is a linear or branched alkylene group having 3 or more and 8 or less carbon atoms, or an alkylene group having 4 or more and 8 or less carbon atoms and including a cyclic hydrocarbon structure having 4 or more and 6 or less carbon atoms.

Examples of the alkylene group as R31 include the following structures:
a linear or branched alkylene group; and
an alkylene group having 4 or more and 8 or less carbon atoms and including a cyclic hydrocarbon structure having 4 or more and 6 or less carbon atoms.

More specifically, the alkylene group may be a structure represented by the following Structural formula (A1).

$$-(CH_2)t1\text{-}Rc1\text{-}(CH_2)u1- \quad \text{Structural formula (A1):}$$

Rc1 represents a single bond or a cyclic hydrocarbon group having 4 or more and 6 or less carbon atoms (for example, an alicyclic cyclic hydrocarbon group or an aromatic cyclic hydrocarbon group); t1 and u1 each independently represent an integer of 0 or more and 8 or less.

When Rc1 is, for example, a single bond, t1 and u1 satisfy a relation of $3 \leq (t1+u1) \leq 8$. When Rc1 is, for example, an alicyclic cyclic hydrocarbon group having 4 or more and 6 or less carbon atoms, the number of carbon atoms (v1=4 to 6) forming the alicyclic cyclic hydrocarbon structure, t1, and u1 satisfy a relation of $4 \leq (t1+v1+u1) \leq 8$.

The moieties represented by $-(CH_2)t1-$ and $-(CH_2)u1-$ may each be independently linear or branched.

The urethane resin particularly preferably has a structure represented by the following Structural formula (5) constituted by Unit (i) including a carbonate bond and Unit (ii) including an ester bond from the viewpoint of the effect of preventing talc derived fogging. The reason for this is inferred as follows. Structural formula (5) has, in addition to the carbonate bond, the ester bond. When the urethane resin has the structure represented by the Structural formula (5), the ester bond lowers the regularity of the carbonate bond, which increases the mobility of the carbonate bond. This facilitates, in the carbonate bond, reception of charges from talc, which inferentially provides better results in terms of talc derived fogging.

Structural formula (5)

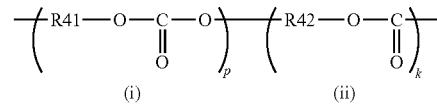

In Structural formula (5), R41 represents a linear or branched alkylene group having 3 or more and 8 or less carbon atoms, or an alkylene group having 4 or more and 8 or less carbon atoms and including a cyclic hydrocarbon structure having 4 or more and 6 or less carbon atoms; R42 represents a linear or branched alkylene group having 3 or more and 8 or less carbon atoms; p is an integer of 1 or more; and k is an integer of 1 or more. When p and k are 2 or more, a plurality of R41 and a plurality of R42 are each independently defined as above.

The structure represented by Structural formula (5) above is constituted by a unit denoted by (i) and a unit denoted by (ii); the numbers of the units are individually denoted by p and k. The structure represented by Structural formula (5) includes at least one of the following structures:

a structure in which Unit (i) and Unit (ii) are bonded together;

a structure: a structure in which Unit (i) and Unit (ii) are bonded together serves as a repeating unit, and such repeating units are bonded together;

a structure: a structure in which a plurality of Units (ii) serving as repeating units are bonded together is bonded to Unit (i);

a structure: a structure in which a plurality of Units (i) serving as repeating units are bonded together is bonded to Unit (ii); and a structure: a structure in which a plurality of Units (i) serving as repeating units are bonded together is bonded to a structure in which a plurality of Units (ii) serving as repeating units are bonded together.

In the structure represented by Structural formula (5) above, p and k more preferably satisfy a relation represented by the following Formula (I).

$$1.4 \leq p/k \leq 1.8 \qquad \text{Formula (I):}$$

p/k represents the content ratio of the carbonate bond to the ester bond in Structural formula (5). When p/k satisfies the above-described range, the resultant developer carrying member exhibits a stronger effect of preventing the talc derived fogging. Examples of the alkylene group as R41 include the following structures:

a linear or branched alkylene group having 3 or more and 8 or less carbon atoms; and an alkylene group having 4 or more and 8 or less carbon atoms and including a cyclic hydrocarbon structure having 4 or more and 6 or less carbon atoms.

More specifically, the alkylene group may have a structure represented by the following Structural formula (A2).

$$-(CH_2)t2\text{-}Rc2\text{-}(CH_2)u2\text{-} \qquad \text{Structural formula (A2):}$$

Rc2 represents a single bond or a cyclic hydrocarbon group having 4 or more and 6 or less carbon atoms (for example, an alicyclic cyclic hydrocarbon group or an aromatic cyclic hydrocarbon group); t2 and u2 each independently represent an integer of 0 or more and 8 or less.

When Rc2 is, for example, a single bond, t2 and u2 satisfy a relation of $3 \leq (t2+u2) \leq 8$.

When Rc2 is, for example, an alicyclic cyclic hydrocarbon group having 4 or more and 6 or less carbon atoms, the number of carbon atoms (v2=4 to 6) forming the alicyclic cyclic hydrocarbon structure, t2, and u2 satisfy a relation of $4 \leq (t2+v2+u2) \leq 8$.

The moieties represented by $-(CH_2)t2\text{-}$ and $-(CH_2)u2\text{-}$ may each be independently linear or branched.

The following is a case of obtaining a urethane resin according to an embodiment of the present disclosure from a polyol having carbonate bonds (hereafter, polycarbonate polyol).

Polycarbonate Polyol

The polycarbonate polyol can be selected from publicly known polycarbonate polyols and polyester-polycarbonate copolymer polyols.

The polycarbonate polyol may be at least one selected from polycarbonate diols and polycarbonate triols. Of these, polycarbonate diols are preferred. Such a polycarbonate diol may be a polycarbonate diol in which alkylene chains that may have a moiety forming a portion of a cyclic structure are repeatedly bonded via carbonate bonds, and the resultant structure has hydroxy groups at both ends.

Examples of such an alkylene chain that may have a moiety forming a portion of a cyclic hydrocarbon structure in the polycarbonate diol include the above-described alkylene chains represented by Structural formula (4) and Structural formula (5).

Examples of the polycarbonate diol include the following:

polynonamethylene carbonate diol, poly(2-methyl-octamethylene) carbonate diol, polyhexamethylene carbonate diol, polypentamethylene carbonate diol, poly(3-methylpentamethylene) carbonate diol, polytetramethylene carbonate diol, polytrimethylene carbonate diol, poly(1,4-cyclohexanedimethylene carbonate) diol, poly(2-ethyl-2-butyltrimethylene) carbonate diol, and random/block copolymers of the foregoing.

At least one of these may be used.

Examples of the polyester-polycarbonate copolymer polyols include the following:

a copolymer obtained by polycondensation of the polycarbonate polyol and a lactone such as ε-caprolactone, and a copolymer of the polycarbonate polyol and a polyester obtained by polycondensation of an alkanediol and a dicarboxylic acid.

Examples of the alkanediol for forming the polyester include alkanediols having 4 to 6 carbon atoms such as 1,4-butanediol, 1,5-pentanediol, 1,6-hexanediol, 3-methylpentanediol, and neopentyl glycol. At least one of these may be used.

Examples of the dicarboxylic acid include adipic acid, sebacic acid, suberic acid, glutaric acid, and pimelic acid. At least one of these may be used.

The polycarbonate polyol can be synthesized by a publicly known method: for example, a dehydrochlorination reaction between phosgene and a low-molecular-weight alcohol used for synthesis of a polyester polyol and having 1 to 8 carbon atoms, or a transesterification reaction between the low-molecular-weight alcohol and, for example, dimethyl carbonate, diethyl carbonate, or diphenyl carbonate.

Alternatively, the polyester-polycarbonate copolymer polyol can also be obtained by a method in which diol and dicarboxylic acid are caused to react, and the resultant polyester oligomer is caused to react with a carbonate compound to achieve polycarbonate copolymerization.

Examples of the diol used for this method include diols having an alkylene chain that may have a cyclic structure. Examples of the alkylene chain that may have a cyclic structure include the above-described structures as R31 of Structural formula (4) and as R41 of Structural formula (5).

Examples of the diol having an alkylene chain that may have a moiety forming a portion of a cyclic structure include 1,3-propanediol, 1,4-butanediol, 1,6-hexanediol, 1,4-bis(hydroxymethyl)cyclohexane, 1,4-bis(hydroxyethyl)cyclohexane 3-methyl-1,5-pentanediol, 1,4-benzenedimethanol, and 1,8-octanediol. At least one of these may be used.

Such diols are preferably used for introducing R31 of Structural formula (4), and R41 in Unit (i) of Structural formula (5).

Examples of the dicarboxylic acid in the above-described method include adipic acid, sebacic acid, suberic acid, glutaric acid, and pimelic acid. At least one of these may be used.

The dicarboxylic acid is preferably used for introducing R42 in the above-described Unit (ii) of Structural formula (5).

The carbonate compound in the above-described method may be a carbonic ester of a lower alcohol having 1 to 3 carbon atoms. Examples of this carbonic ester include dimethyl carbonate and diethyl carbonate.

The degree of polymerization of the polyester-polycarbonate copolymer polyol is preferably adjusted so as to satisfy the above-described Formula (I).

Polyisocyanate

Examples of the polyisocyanate include polyisocyanates publicly known as being used for synthesis of urethane resins, and polyisocyanates usable for synthesis of urethane resins.

Examples of the polyisocyanate include aliphatic polyisocyanates such as ethylene diisocyanate and 1,6-hexamethylene diisocyanate (HDI); alicyclic polyisocyanates such as isophorone diisocyanate (IPDI), cyclohexane 1,3-diisocyanate, and cyclohexane 1,4-diisocyanate; aromatic isocyanates such as 2,4-tolylene diisocyanate, 2,6-tolylene diisocyanate (TDI), 4,4'-diphenylmethane diisocyanate (MDI), polymeric diphenylmethane diisocyanate, xylylene diisocyanate, and naphthalene diisocyanate; copolymers, isocyanurates, TMP adducts, and biurets of the foregoing, and isocyanate compounds such as blocked isocyanates of the foregoing. At least one of these may be used.

As a starting material for obtaining a urethane resin according to the present disclosure, a polyisocyanate having a carbonate bond in the molecule thereof may be used.

Examples of the polyisocyanate having a carbonate bond in the molecule thereof, include the above-described polycarbonate polyol or polyester-polycarbonate copolymer polyol modified with the above-described polyisocyanate.

Amino Compound

An amino compound according to the present disclosure may be a chemical substance containing a tertiary amino structure, and is particularly preferably a chemical substance that is a compound represented by the following Structural formula (2).

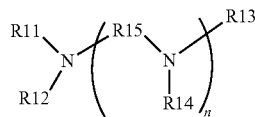

Structural formula (2)

In Structural formula (2), R15 represents a linear or branched alkylene group having 2 or more and 4 or less carbon atoms; n is an integer of 0 or more and 4 or less; when n is 2 or more and 4 or less, a plurality of R15 are each independently defined as above, when n is 0, R11 to R13 are each independently selected from the following (a2), (b), (c), and (d), R11 to R14 in a case where n is 1 and R11 to R13 and a plurality of R14 in a case where n is 2 or more and 4 or less are each independently selected from the following (a1), (a2), (b), (c), and (d), provided that, when n is 1, R11 to R14 are all selected from the following (b) to (d), when n is 2 or more and 4 or less, at least four of R11 to R13 and two to four R14 are selected from the following (b) to (d):

(a1) a hydrogen atom (a2) a linear or branched alkyl group having 1 to 4 carbon atoms;

(b) a linear or branched hydroxyalkyl group having 1 or more and 8 or less carbon atoms;

(c) a linear or branched aminoalkyl group having 2 or more and 8 or less carbon atoms; and (d) a group represented by the following Structural formula (3):

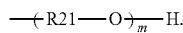

Structural formula (3)

In Structural formula (3), m is 2 or 3. A plurality of R21 each independently represent a linear or branched alkylene group having 2 or more and 5 or less carbon atoms.

Examples of (a2) include a hydrogen atom, a methyl group, an ethyl group, a propyl group, and a butyl group.

Examples of (b) include a hydroxymethyl group, a hydroxyethyl group, a hydroxypropyl group, a hydroxybutyl group, a hydroxypentyl group, a hydroxyhexyl group, a hydroxyheptyl group, a hydroxyoctyl group, and a 2-hydroxypropyl group.

Examples of (c) include an aminoethyl group, an aminopropyl group, an aminobutyl group, an aminopentyl group, an aminohexyl group, an aminoheptyl group, and an aminooctyl group. Examples of R21 include an ethylene group, a propylene group, a butylene group, a pentylene group, and a 2-methylbutylene group.

The compound represented by Structural formula (2) is preferable from the viewpoint of achieving both of prevention of talc derived fogging and imparting of appropriate triboelectricity, and is particularly preferably a compound represented by the following Structural formula (6) for the following reason.

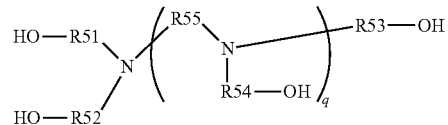

Structural formula (6)

In Structural formula (6), R55 represents a linear or branched alkylene group having 2 or more and 4 or less carbon atoms; q is an integer of 0 or more and 4 or less; when q is 2 or more and 4 or less, a plurality of R55 are each independently defined as above. R51 to R54 each independently represent a linear or branched alkylene group having 2 or more and 5 or less carbon atoms; when q is 2 or more and 4 or less, a plurality of R54 are each independently defined as above.

The amino compound represented by Structural formula (6) has hydroxy groups. Functional groups of the amino compound are preferably hydroxy groups, compared with amino groups, from the viewpoint of providing a stronger effect of suppressing talc derived fogging.

The reason for this is inferred by the inventors of the present disclosure as follows: bonds obtained after the reaction with polyisocyanate are different between the case of hydroxy groups (urethane bonds) and the case of amino groups (urea bonds). In the case of hydroxy groups, after the reaction, urethane bonds are formed. The formed urethane bonds form hydrogen bonds with other urethane bonds in the resin, to form a reinforced hard segment around the tertiary nitrogen atom of the amino compound. When the resin has a reinforced hard segment, talc becomes less likely to enter the hard segment, so that transfer of charges between talc and the tertiary nitrogen becomes less likely to occur. As a result, excessive charging of talc is further suppressed, which inferentially provides more preferred results in terms of talc derived fogging.

Polyol

The materials for forming the surface layer may include, in addition to the above-described materials, a polyol and/or polyester polyol not having a carbonate bond. The polyol has a plurality of hydroxy groups in the molecule thereof, and the hydroxy groups react with the polyisocyanate.

The polyol not having a carbonate bond is not particularly limited; examples include polyether polyol and polyester polyol. Examples of the polyether polyol include polyethylene glycol, polypropylene glycol, and polytetramethylene glycol.

The polyester polyol not having a carbonate bond may be a polyester polyol obtained by a condensation reaction between a diol component such as 1,4-butanediol, 3-methyl-1,4-pentanediol, or neopentyl glycol or a triol component such as trimethylolpropane, and a dicarboxylic acid or carboxylic anhydride such as adipic acid, phthalic anhydride, terephthalic acid, or hexahydroxyphthalic acid.

The polyether polyol and the polyester polyol may be optionally prepared as prepolymers having extended chains using an isocyanate such as 2,4-tolylene diisocyanate (TDI), 1,4 diphenylmethane diisocyanate (MDI), or isophorone diisocyanate (IPDI).

In a urethane resin forming a surface layer according to the present disclosure, the ratio (L/M) of the number of isocyanate groups (L) to the number of hydroxy groups and/or amino groups (M) is preferably 1.0 to 2.0. The number of hydroxy groups and/or amino groups is the sum of hydroxy groups of polycarbonate polyol and/or polyester-polycarbonate copolymer polyol and hydroxy groups and/or amino groups of the amino compound. In the case of using the polyol and/or polyester polyol not having a carbonate bond, the number of hydroxy groups and/or amino groups is the sum further including the number of hydroxy groups of the polyol and/or polyester polyol not having a carbonate bond.

In the case of using the polyol and/or polyester polyol not having a carbonate bond, the polyol and/or polyester polyol is preferably added such that the ratio (L/M) satisfies the above-described range.

To the surface layer, as long as advantages of the present disclosure are not degraded, the following may be optionally added: an ordinary resin other than a resin according to the present disclosure, a rubber material, a compounding ingredient, a conductivity imparting agent, a non-conductive filler, a crosslinking agent, and a catalyst. The resin added is not particularly limited; examples include epoxy resins, urethane resins, urea resins, ester resins, amide resins, imide resins, amide-imide resins, phenol resins, vinyl resins, silicone resins, and fluororesins. Examples of the rubber material include ethylene-propylene-diene copolymer rubber, acrylonitrile-butadiene rubber, chloroprene rubber, natural rubber, isoprene rubber, styrene-butadiene rubber, silicone rubber, epichlorohydrin rubber, and urethane rubber.

Examples of the compounding ingredient include compounding ingredients ordinarily used for resins, such as fillers, softeners, processing aids, tackifiers, anti-blocking agents, and blowing agents.

The conductivity imparting agent may be fine particles of carbon black; a conductive metal such as aluminum or copper; or a conductive metal oxide such as conductive zinc oxide, conductive tin oxide, or conductive titanium oxide. Examples of the non-conductive filler include silica, quartz powder, titanium oxide, and calcium carbonate. The crosslinking agent is not particularly limited; examples include tetraethoxysilane, di-t-butyl peroxide, 2,5-dimethyl-2,5-di(t-butylperoxy)hexane, and dicumyl peroxide.

When the developer carrying member is provided to include a surface layer having a surface roughness, the surface layer may be formed with addition of fine particles for roughness control. The roughness-control fine particles preferably have a volume-average particle size of 3 to 20 µm because the resultant developer carrying member has a high capability of conveying toner. The amount of the fine particles added to the surface layer relative to 100 parts by mass of the resin solid content of the surface layer is preferably 1 to 50 parts by mass because advantages of the present disclosure are not degraded. The roughness-control fine particles may be fine particles of a polyurethane resin, a polyester resin, a polyether resin, a polyamide resin, an acrylic resin, or a phenol resin.

The method of forming the surface layer is not particularly limited; examples include spraying, immersion, or roll coating using a coating material. An immersion coating method described in Japanese Patent Laid-Open No. 57-5047 in which a coating material overflows from the upper end of the immersion tank is a simple and high-production-stability method for forming the surface layer.

Developer carrying members according to embodiments of the present disclosure are applicable to development devices using a one-component magnetic developer or a one-component non-magnetic developer in which a developer carrying member is not in contact with an electrophotographic photoconductor, development devices using a one-component magnetic developer or a one-component non-magnetic developer in which a developer carrying member is in contact with an electrophotographic photoconductor, and development devices using a two-component developer.

Process Cartridge and Electrophotographic Apparatus

Figure 2:
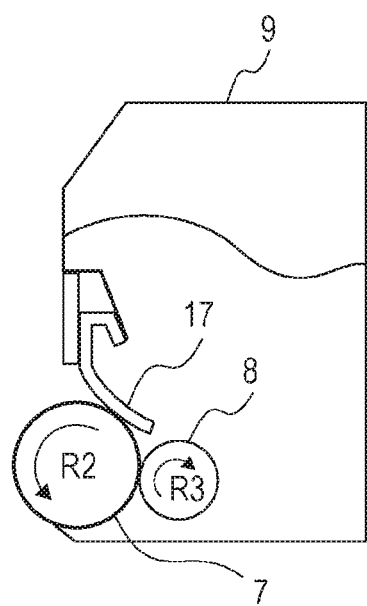
FIG. 2 is a schematic configuration view of an example of a process cartridge according to the present disclosure.
Figure 3:
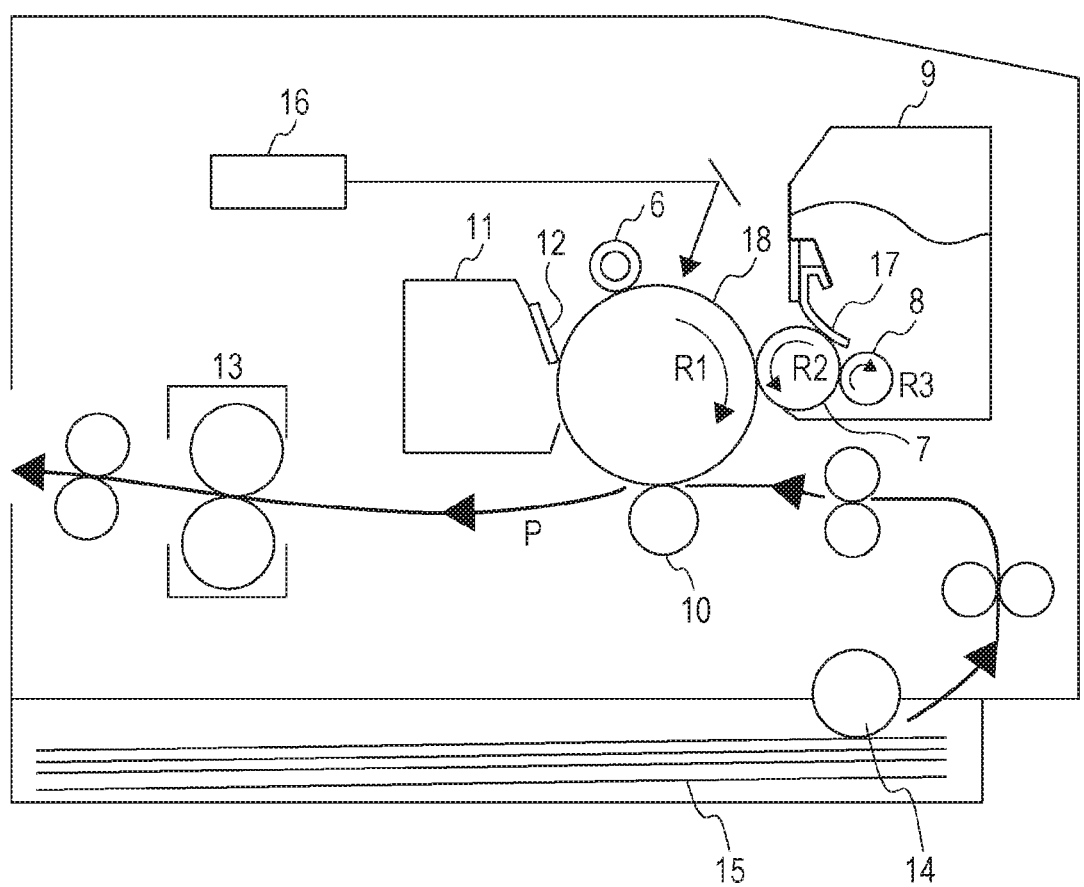
FIG. 3 is a schematic configuration view of an example of an electrophotographic apparatus according to the present disclosure.

A process cartridge and an electrophotographic apparatus according to embodiments of the present disclosure will be described in detail with reference to drawings; however, the present disclosure is not limited to these embodiments. FIG. 2 is a schematic configuration view of an example of a process cartridge using, as a development member, a developer carrying member according to an embodiment of the present disclosure. FIG. 3 is a schematic configuration view of an example of an electrophotographic apparatus to which the process cartridge is detachably incorporated.

The process cartridge illustrated in FIG. 2 includes a toner container 9, a developer carrying member 7, a developer regulating member 17, and a developer supply member 8, and is configured to be detachably attached to the main body of an electrophotographic apparatus. In FIG. 3, an electrostatic-latent-image carrier 18, which is an image carrier having an electrostatic latent image, is rotated in a direction represented by arrow R1. The developer carrying member 7 rotates in a direction represented by arrow R2, to thereby convey a developer to a development region where the developer carrying member 7 and the electrostatic-latent-image carrier 18 face each other. The electrophotographic apparatus according to this embodiment employs, what is called, the contact development mode in which the developer carrying member 7 is disposed in contact with the electrostatic-latent-image carrier 18. The developer supply member 8 is in contact with the developer carrying member, and rotates in direction R3, to supply the developer to the surface of the developer carrying member 7.

Around the electrostatic-latent-image carrier 18, a charging roller 6 as a charging member disposed so as to be configured to perform charging, a transfer member (transfer roller) 10, a cleaner container 11, a cleaning blade 12, a fixing device 13, and a pickup roller 14 are disposed. The electrostatic-latent-image carrier 18 is charged with the charging roller 6. Subsequently, a laser beam is radiated from a lasing device 16 to the electrostatic-latent-image carrier 18 to thereby perform exposure, to form an electrostatic latent image corresponding to a target image. The electrostatic latent image on the electrostatic-latent-image carrier 18 is developed with a developer conveyed with the developer carrying member 7 from within the toner container 9 of a process cartridge serving as a development device. This development is, what is called, the reversal process in which the exposed area is developed with the developer.

A transfer material (paper) P is transported from a paper feed unit 15 using the pickup roller 14 and the like into the apparatus. The image is transferred, onto the transfer material (paper) P, using the transfer member (transfer roller) 10 in contact with the electrostatic-latent-image carrier 18 with the transfer material (paper) P disposed therebetween. The transfer material (paper) P having the image thereon is transported to the fixing device 13, and the developer is fixed on the transfer material (paper) P. The residual developer on the electrostatic-latent-image carrier 18 is scraped off using the cleaning blade 12, and collected into the cleaner container 11.

The developer regulating member 17 is preferably in contact with the developer carrying member 7 with the developer disposed therebetween to thereby regulate the thickness of the layer of the developer on the developer carrying member. The developer regulating member in contact with the developer carrying member is ordinarily a regulating blade, which is also suitably usable in the electrophotographic apparatus according to this embodiment.

Examples of the material forming the regulating blade include elastic materials of rubbers such as silicone rubber, urethane rubber, and NBR; elastic materials of synthetic resins such as polyethylene terephthalate; metal elastic materials such as phosphor bronze plates and stainless steel (SUS) plates; and composite materials of the foregoing. The material forming the regulating blade may have, in order to control the charging properties of the developer, a structure in which, to an elastic support member such as a rubber, synthetic resin, or metal elastic member, a charging control material such as resin, rubber, metal oxide, or metal is bonded. In this case, the regulating blade is used such that the portion formed of the charging control material is in contact with the developer carrying member. The regulating blade is particularly preferably provided by bonding resin or rubber to a metal elastic member. Such resin or rubber is preferably a resin or rubber that tends to be positively charged, such as urethane rubber, urethane resin, polyamide resin, or nylon resin.

EXAMPLES

Hereinafter, specific Examples and Comparative Examples will be described. The present disclosure is not limited to these Examples.

Production of Elastic Roller K-1

To an aluminum hollow cylinder ground so as to have an outer diameter of 10 mm and an arithmetic mean roughness Ra of 0.2 μm, a primer (trade name: DY35-051; manufactured by Dow Corning Toray Co., Ltd.) was applied and baked, to obtain a base member. This base member was placed into a mold, and an addition-type silicone rubber composition prepared by mixing the following materials was injected into cavities formed in the mold:

Liquid silicone rubber material (trade name: SE6724A/B; manufactured by Dow Corning Toray Co., Ltd.): 100 parts by mass;

Carbon black (trade name: TOKABLACK #4300; manufactured by TOKAI CARBON CO., LTD.: 15 parts by mass;
Silica powder (as a heat resistance imparting agent): 0.2 parts by mass; and Platinum catalyst: 0.1 parts by mass.

Subsequently, the mold was heated to vulcanize and cure the silicone rubber at a temperature of 150° C. for 15 minutes. The base member having, on its circumferential surface, a cured silicone rubber layer was released from the mold. Subsequently, the base member was further heated at a temperature of 180° C. for 1 hour, to complete the curing reaction of the silicone rubber layer. In this way, an elastic roller K-1 was produced in which, on the outer circumference of the base member, a silicone rubber elastic layer having a film thickness of 0.7 mm and a diameter of 11.4 mm was formed.

Preparation of Starting Materials for Forming Surface Layer
Synthesis of Isocyanate-Group-Terminated Prepolymer A synthesis example of an isocyanate-group-terminated prepolymer, which is one of starting materials for synthesizing the urethane resin of the surface layer, will be described.

Starting polyols B-1 to B-15 used for synthesizing isocyanate-group-terminated prepolymers were first prepared.

As Starting polyols B-1, B-6 to B-12, and B-16, commercially available products described in Table 1 were employed.

TABLE 1

| Starting polyol No. | |
|---|---|
| B-1 | "NIPPOLAN 982" (trade name, manufactured by Tosoh Corporation) |
| B-6 | "ETERNACOLL UH-200" (trade name, manufactured by Ube Industries, Ltd.) |
| B-7 | "ETERNACOLL UH-50" (trade name, manufactured by Ube Industries, Ltd.) |
| B-8 | "ETERNACOLL UH-300" (trade name, manufactured by Ube Industries, Ltd.) |
| B-9 | "DURANOL T5652" (trade name, manufactured by Asahi Kasei Chemicals Corporation) |
| B-10 | "ETERNACOLL UC-100" (trade name, manufactured by Ube Industries, Ltd.) |
| B-11 | "KURARAY POLYOL C1090" (trade name, manufactured by KURARAY CO., LTD.) |
| B-12 | "KURARAY POLYOL C3090" (trade name, manufactured by KURARAY CO., LTD.) |
| B-16 | "NIPPOLAN 4010" (trade name, manufactured by Tosoh Corporation) |

Starting polyols B-2 to B-5 and B-13 to B-15 were synthesized by the following method.

Synthesis of Starting Polyol B-2

To a three-neck flask equipped with a stirrer and a thermometer, a dicarboxylic acid that was 100.0 g (0.50 mol) of sebacic acid (manufactured by Tokyo Chemical Industry Co., Ltd.), a diol that was 87.0 g (1.14 mol) of 1,3-propanediol (manufactured by Tokyo Chemical Industry Co., Ltd.), and 20.0 mg of tetra-n-butyl orthotitanate tetramer (manufactured by Tokyo Chemical Industry Co., Ltd.) were charged and caused to react under a nitrogen atmosphere at 160° C. for 4 hours. Subsequently, under a nitrogen atmosphere, the reaction solution was cooled to 100° C. The pressure was lowered to 150 mmHg over 1 hour, then lowered from 150 mmHg to 40 mmHg over 30 minutes, to obtain a polyester oligomer. Subsequently, in order to perform polycarbonate copolymerization, 76.7 g (0.65 mol) of diethyl carbonate (manufactured by Mitsui Fine Chemicals, Inc.) and 1.0 mg of zinc acetate dihydrate (manufactured by NACALAI TESQUE, INC.) were added and caused to react under a reduced pressure. The reaction was caused for 2 hours, to obtain Starting polyol B-2.

Synthesis of Starting Polyols B-3 to B-5 and B-13 to B-15

The same method as in Synthesis of Starting polyol B-2 above was performed except that the starting materials used for the reactions and the amounts of the starting materials mixed were changed as described in the following Table 2, to synthesize Starting polyols B-3 to B-5 and B-13 to B-15.

TABLE 2

| Starting polyol No. | Dicarboxylic acid Species | Parts by mass | Diol Species | Parts by mass | Diethyl carbonate Parts by mass |
|---|---|---|---|---|---|
| B-2 | Sebacic acid (manufactured by Tokyo Chemical Industry Co., Ltd.) | 100.0 | 1,3-Propanediol (manufactured by Tokyo Chemical Industry Co., Ltd.) | 87.0 | 76.7 |
| B-3 | Suberic acid (manufactured by Tokyo Chemical Industry Co., Ltd.) | 100.0 | 1,4-Butanediol (manufactured by Mitsubishi Chemical Corporation) | 135.0 | 109.2 |
| B-4 | Sebacic acid (manufactured by Tokyo Chemical Industry Co., Ltd.) | 100.0 | 1,3-Propanediol (manufactured by Tokyo Chemical Industry Co., Ltd.) | 107.8 | 108.9 |
| B-5 | Suberic acid (manufactured by Tokyo Chemical Industry Co., Ltd.) | 100.0 | 1,4-Butanediol (manufactured by Mitsubishi Chemical Corporation) | 113.1 | 80.5 |
| B-13 | Glutaric acid (manufactured by Tokyo Chemical Industry Co., Ltd.) | 100.0 | 1,3-Propanediol (manufactured by Tokyo Chemical Industry Co., Ltd.) | 143.0 | 132.6 |
| B-14 | Sebacic acid (manufactured by Tokyo Chemical Industry Co., Ltd.) | 100.0 | 1,6-Octanediol (manufactured by Wako Pure Chemical Industries, Ltd.) | 161.1 | 71.8 |
| B-15 | Pimelic acid (manufactured by Tokyo Chemical Industry Co., Ltd.) | 100.0 | 1,4-Benzenedimethanol (manufactured by Tokyo Chemical Industry Co., Ltd.) | 206.9 | 103.1 |

The structures included in Starting polyols B-1 to B16, hydroxyl values, and copolymerization ratios will be described in the following Table 3 and Structural formulas (4), (5), and (7) to (9). The copolymerization ratios were measured in a standard manner employing $^{13}C$ NMR.

TABLE 3

| Starting polyol No. | Structural formula included | Structures contained in molecule | Copolymerization ratio | Hydroxyl value (mgKOH/g) |
|---|---|---|---|---|
| B-1 | (5) | R42 = —(CH$_2$)$_5$— R41 = —(CH$_2$)$_6$— | p/k = 1.65 | 56.0 |
| B-2 | (5) | R42 = —(CH$_2$)$_8$— R41 = —(CH$_2$)$_3$— | p/k = 1.55 | 55.0 |
| B-3 | (5) | R42 = —(CH$_2$)$_6$— R41 = —(CH$_2$)$_4$— | p/k = 1.9 | 55.0 |
| B-4 | (5) | R42 = —(CH$_2$)$_8$— R41 = —(CH$_2$)$_3$— | p/k = 2.2 | 55.0 |
| B-5 | (5) | R42 = —(CH$_2$)$_6$— R41 = —(CH$_2$)$_4$— | p/k = 1.4 | 55.0 |
| B-6 | (4) | — R31 = —(CH$_2$)$_6$— | — | 56.0 |
| B-7 | (4) | — R31 = —(CH$_2$)$_6$— | — | 224.0 |
| B-8 | (4) | — R31 = —(CH$_2$)$_6$— | — | 37.0 |
| B-9 | (7) | R62 = —(CH$_2$)$_5$— R61 = —(CH$_2$)$_6$— | r/s = 1.00 | 56.0 |
| B-10 | (4) | — R31 = —CH$_2$—⟨cyclohexane⟩—CH$_2$— | — | 110.0 |
| B-11 | (7) | R62 = —(CH$_2$)$_6$— R61 = —(CH$_2$)$_2$—CHCH$_3$—(CH$_2$)$_2$— | r/s = 9.00 | 112.0 |
| B-12 | (7) | R62 = —(CH$_2$)$_6$— R61 = —(CH$_2$)$_2$—CHCH$_3$—(CH$_2$)$_2$— | r/s = 9.00 | 37.4 |
| B-13 | (5) | R42 = —(CH$_2$)$_3$— R41 = —(CH$_2$)$_3$— | p/k = 1.75 | 56.0 |
| B-14 | (5) | R42 = —(CH$_2$)$_8$— R41 = —(CH$_2$)$_8$— | p/k = 1.45 | 56.0 |
| B-15 | (8) | R72 = —(CH$_2$)$_5$— R71 = —CH$_2$—⟨benzene⟩—CH$_2$— | x/y = 1.65 | 56.0 |
| B-16 | (9) | — R81 = —(CH$_2$)$_4$— | — | 56.0 |

The following are structures of Structural formulas (4), (5), and (7) to (9) described in Table 3.

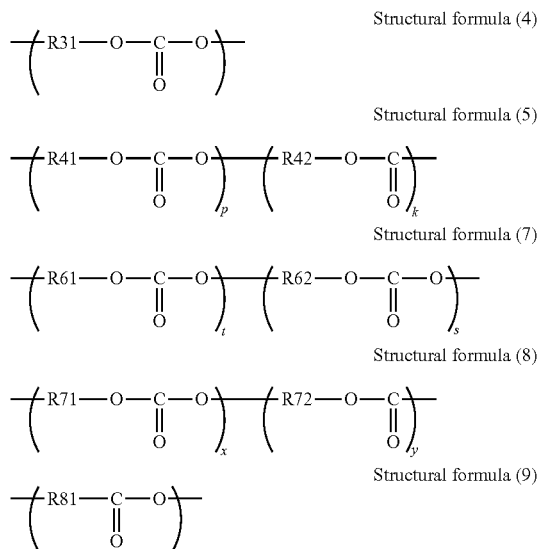

Preparation of Starting Isocyanates

As Starting isocyanates C-1 to C-3 for reacting with the above-described Starting polyols to prepare isocyanate-group-terminated prepolymers described later, the following commercially available products were prepared:

Starting isocyanate C-1 (pure-MDI): "Millionate MT" (trade name; manufactured by Tosoh Corporation), Starting isocyanate C-2 (polymeric MDI): "Millionate MR" (trade name; manufactured by Tosoh Corporation), and Starting isocyanate C-3 (tolylene diisocyanate): "COSMONATE T80" (trade name; manufactured by Mitsui Chemicals, Inc.).

Synthesis of Isocyanate-Group-Terminated Prepolymer A-1

Under a nitrogen atmosphere, in a reaction vessel, 30.8 parts by mass of Starting isocyanate C-1 was dissolved in methyl ethyl ketone (hereafter MEK) such that the final solid content became 50%. Subsequently, 100.0 parts by mass of Starting polyol B-1 was gradually added dropwise while the internal temperature of the reaction vessel was maintained at 65° C.

After the dropwise addition was complete, a reaction was caused at a temperature of 65° C. for 2 hours. The resultant reaction mixture was cooled to room temperature, to obtain Isocyanate-group-terminated prepolymer A-1 having a solid content of 50% and an isocyanate group content of 4.7 wt %.

Synthesis of Isocyanate-Group-Terminated Prepolymers A-2 to A-25

The same method as in Synthesis of Isocyanate-group-terminated prepolymer A-1 was performed except that the species and mixing amounts of Starting polyol and Starting isocyanate used for the synthesis and the reaction time were changed as described in Table 4, to obtain Isocyanate-group-terminated prepolymers A-2 to A-25 as solutions having a solid content of 50%.

TABLE 4

| Isocyanate-group-terminated prepolymer No. | Starting polyol No. | Parts by mass | Starting isocyanate No. | Parts by mass | Reaction time (h) |
|---|---|---|---|---|---|
| A-1  | B-1  | 100.0 | C-1 | 30.8  | 2.0 |
| A-2  | B-1  | 100.0 | C-1 | 37.0  | 2.5 |
| A-3  | B-1  | 100.0 | C-2 | 22.2  | 2.0 |
| A-4  | B-1  | 100.0 | C-2 | 19.7  | 1.5 |
| A-5  | B-2  | 100.0 | C-3 | 21.4  | 2.0 |
| A-6  | B-3  | 100.0 | C-3 | 21.4  | 2.0 |
| A-7  | B-4  | 100.0 | C-2 | 30.3  | 2.5 |
| A-8  | B-5  | 100.0 | C-2 | 30.3  | 2.5 |
| A-9  | B-6  | 100.0 | C-2 | 49.3  | 3.0 |
| A-10 | B-6  | 100.0 | C-2 | 61.7  | 3.0 |
| A-11 | B-6  | 100.0 | C-2 | 67.8  | 4.0 |
| A-12 | B-7  | 100.0 | C-2 | 123.3 | 4.0 |
| A-13 | B-8  | 100.0 | C-2 | 32.6  | 2.5 |
| A-14 | B-9  | 100.0 | C-2 | 49.3  | 3.0 |
| A-15 | B-10 | 100.0 | C-2 | 60.6  | 3.5 |
| A-16 | B-11 | 100.0 | C-2 | 61.7  | 3.5 |
| A-17 | B-12 | 100.0 | C-2 | 41.2  | 2.5 |
| A-18 | B-1  | 100.0 | C-2 | 18.5  | 1.5 |
| A-19 | B-1  | 100.0 | C-2 | 30.8  | 2.5 |
| A-20 | B-13 | 100.0 | C-2 | 30.8  | 4.0 |
| A-21 | B-14 | 100.0 | C-2 | 30.8  | 1.5 |
| A-22 | B-13 | 100.0 | C-2 | 30.8  | 4.0 |
| A-23 | B-15 | 100.0 | C-1 | 30.8  | 4.0 |
| A-24 | B-1  | 100.0 | C-2 | 19.7  | 3.0 |
| A-25 | B-16 | 100.0 | C-2 | 30.8  | 4.0 |

Table 5 describes structural formulas representing structures included in the obtained isocyanate-group-terminated prepolymers, carbonate-bond concentration, and isocyanate-group concentration. Incidentally, Structural formulas (4), (5), and (7) to (9) in Table 5 are the same as the Structural formulas described in Table 3. The carbonate-bond concentration and the isocyanate-group concentration are values relative to 100 mass % of the solid content of an isocyanate-group-terminated prepolymer.

TABLE 5

| Isocyanate-group-terminated prepolymer No. | Structural formula included | Structures contained in molecule | | Co-polymerization ratio | Isocyanate-group concentration (mass %) | Carbonate-bond concentration (mass %) |
|---|---|---|---|---|---|---|
| A-1  | (5) | R41 = —(CH$_2$)$_6$— | R42 = —(CH$_2$)$_5$— | p/k = 1.65 | 9.4  | 20.6 |
| A-2  | (5) | R41 = —(CH$_2$)$_6$— | R42 = —(CH$_2$)$_5$— | p/k = 1.65 | 9.5  | 19.7 |
| A-3  | (5) | R41 = —(CH$_2$)$_6$— | R42 = —(CH$_2$)$_5$— | p/k = 1.65 | 7.1  | 22.1 |
| A-4  | (5) | R41 = —(CH$_2$)$_6$— | R42 = —(CH$_2$)$_5$— | p/k = 1.65 | 9.8  | 22.6 |
| A-5  | (5) | R41 = —(CH$_2$)$_3$— | R42 = —(CH$_2$)$_8$— | p/k = 1.55 | 9.2  | 24.4 |
| A-6  | (5) | R41 = —(CH$_2$)$_4$— | R42 = —(CH$_2$)$_6$— | p/k = 1.9  | 9.3  | 26.9 |
| A-7  | (5) | R41 = —(CH$_2$)$_3$— | R42 = —(CH$_2$)$_8$— | p/k = 2.2  | 13.0 | 26.6 |
| A-8  | (5) | R41 = —(CH$_2$)$_4$— | R42 = —(CH$_2$)$_6$— | p/k = 1.4  | 13.1 | 22.2 |
| A-9  | (4) | R31 = —(CH$_2$)$_6$— | — | — | 14.1 | 27.9 |
| A-10 | (4) | R31 = —(CH$_2$)$_6$— | — | — | 14.2 | 25.7 |
| A-11 | (4) | R31 = —(CH$_2$)$_6$— | — | — | 9.6  | 24.8 |
| A-12 | (4) | R31 = —(CH$_2$)$_6$— | — | — | 13.2 | 18.6 |
| A-13 | (4) | R31 = —(CH$_2$)$_6$— | — | — | 11.0 | 31.4 |
| A-14 | (7) | R61 = —(CH$_2$)$_6$— | R62 = —(CH$_2$)$_5$— | r/s = 1.00 | 13.1 | 28.9 |

TABLE 5-continued

| Isocyanate-group-terminated prepolymer No. | Structural formula included | Structures contained in molecule | | Co-polymerization ratio | Isocyanate-group concentration (mass %) | Carbonate-bond concentration (mass %) |
|---|---|---|---|---|---|---|
| A-15 | (4) | R31 = —CH$_2$—⟨ ⟩—CH$_2$— | | — | 9.2 | 22.0 |
| A-16 | (7) | R61 = —(CH$_2$)$_2$—CHCH$_3$—(CH$_2$)$_2$— | R62 = —(CH$_2$)$_6$— | r/s = 9.00 | 8.9 | 25.7 |
| A-17 | (7) | R61 = —(CH$_2$)$_2$—CHCH$_3$—(CH$_2$)$_2$— | R62 = —(CH$_2$)$_6$— | r/s = 9.00 | 13.2 | 29.5 |
| A-18 | (5) | R41 = —(CH$_2$)$_6$— | R42 = —(CH$_2$)$_5$— | p/k = 1.65 | 14.1 | 22.8 |
| A-19 | (5) | R41 = —(CH$_2$)$_6$— | R42 = —(CH$_2$)$_5$— | p/k = 1.65 | 8.8 | 20.6 |
| A-20 | (5) | R41 = —(CH$_2$)$_3$— | R42 = —(CH$_2$)$_3$— | p/k = 1.75 | 7.8 | 30.3 |
| A-21 | (5) | R41 = —(CH$_2$)$_8$— | R42 = —(CH$_2$)$_8$— | p/k = 1.45 | 11.2 | 16.4 |
| A-22 | (5) | R41 = —(CH$_2$)$_3$— | R42 = —(CH$_2$)$_3$— | p/k = 1.75 | 7.8 | 30.3 |
| A-23 | (8) | R71 = —CH$_2$—⟨ ⟩—CH$_2$— | R72 = —(CH$_2$)$_5$— | x/y = 1.65 | 7.3 | 21.7 |
| A-24 | (5) | R41 = —(CH$_2$)$_6$— | R42 = —(CH$_2$)$_5$— | p/k = 1.65 | 7.3 | 22.6 |
| A-25 | (9) | R81 = —(CH$_2$)$_4$— | | — | 8.8 | 0.0 |

Synthesis of Amino Compound
Synthesis of Amino Compound D-1

In a reaction vessel equipped with a stirring unit, a thermometer, a dropping unit, and a temperature control unit, under stirring, a starting amino compound that was 10.0 g (0.11 mol) of 1,4-diaminobutane and a reaction solvent that was 200 ml of pure water were heated to 40° C. Subsequently, while the reaction temperature was maintained at 40° C. or less, an addition starting material that was 38.3 g (0.66 mol) of propylene oxide was gradually added dropwise over 30 minutes. Stirring was further performed for 2 hours to cause the reaction, to obtain a reaction mixture. The obtained reaction mixture was heated under a reduced pressure to drive off water, to obtain Amino compound D-1 (tetrakis(2-hydroxypropyl)butylenediamine).

Synthesis of Amino Compounds D-2 to D-10 and D-12 to D-14

The same method as in Amino compound D-1 was performed except that the species and amounts of the starting amino compound and the addition starting material were changed as described in Table 6, to synthesize Amino compounds D-2 to D-10 and D-12 to D-14.

TABLE 6

| | Starting amino compound | | Addition starting material compound | | |
|---|---|---|---|---|---|
| Amino compound No. | Compound name | Amount of addition (parts by mass) | Compound name | Amount of addition (parts by mass) | Solvent |
| D-1 | 1,4-Diaminobutane (manufactured by Tokyo Chemical Industry Co., Ltd.) | 10.0 | Propylene oxide (manufactured by NACALAI TESQUE, INC.) | 58.0 | Pure water |
| D-2 | Diethylenetriamine (manufactured by Tokyo Chemical Industry Co., Ltd.) | 10.0 | Propylene oxide (manufactured by NACALAI TESQUE, INC.) | 42.2 | Pure water |
| D-3 | Diethylenetriamine (manufactured by Tokyo Chemical Industry Co., Ltd.) | 10.0 | 6-Bromo-1-hexanol (manufactured by Tokyo Chemical Industry Co., Ltd.) | 131.8 | Ethanol |
| D-4 | Triethylenetetramine (manufactured by Wako Pure Chemical Industries, Ltd.) | 10.0 | 3-Bromo-1-propanol (manufactured by Wako Pure Chemical Industries, Ltd.) | 85.7 | Ethanol |
| D-5 | Triethylenetetramine (manufactured by Wako Pure Chemical Industries, Ltd.) | 10.0 | 8-Bromo-1-octanol (manufactured by Tokyo Chemical Industry Co., Ltd.) | 128.8 | Ethanol |
| D-6 | Triethylenetetramine (manufactured by Wako Pure Chemical Industries, Ltd.) | 10.0 | 2-[2-(2-Chloroethoxy)ethoxy]ethanol (manufactured by Tokyo Chemical Industry Co., Ltd.) | 103.9 | Ethanol |
| D-7 | Tetraethylenepentamine (manufactured by Wako Pure Chemical Industries, Ltd.) | 10.0 | Propylene oxide (manufactured by NACALAI TESQUE, INC.) | 32.2 | Pure water |
| D-8 | Triethylenetetramine (manufactured by Wako Pure Chemical Industries, Ltd.) | 10.0 | 2-Bromo-1-ethanol (manufactured by Wako Pure Chemical Industries, Ltd.) | 77.1 | Ethanol |
| D-9 | Triethylenetetramine (manufactured by Wako Pure Chemical Industries, Ltd.) | 10.0 | 4-Bromo-1-butanol (manufactured by Tokyo Chemical Industry Co., Ltd.) | 94.3 | Ethanol |

TABLE 6-continued

| Amino compound No. | Starting amino compound | | Addition starting material compound | | |
|---|---|---|---|---|---|
| | Compound name | Amount of addition (parts by mass) | Compound name | Amount of addition (parts by mass) | Solvent |
| D-10 | Ethylenediamine (manufactured by NACALAI TESQUE, INC.) | 10.0 | p-Formaldehyde (manufactured by NACALAI TESQUE, INC.) | 30.0 | Pure water |
| D-12 | Ethylenediamine (manufactured by NACALAI TESQUE, INC.) | 10.0 | 3-Bromopropylamine hydrobromide (manufactured by Tokyo Chemical Industry Co., Ltd.) | 102.4 | Pure water |
| D-13 | Diethylenetriamine (manufactured by Tokyo Chemical Industry Co., Ltd.) | 10.0 | 3-Bromopropylamine hydrobromide (manufactured by Tokyo Chemical Industry Co., Ltd.) | 74.5 | Pure water |
| D-14 | Triethylenetetramine (manufactured by Wako Pure Chemical Industries, Ltd.) | 10.0 | 6-Bromohexylamine hydrobromide (manufactured by J&K Chemical Ltd.) | 128.8 | Ethanol |

The structures of the obtained Amino compounds D-1 to D-10 and D-12 to D-14 will be described with Structural formula (10) and Table 7.

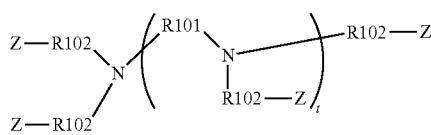

Structural formula (10)

TABLE 7

| No. | t | R101 | R102 | Z |
|---|---|---|---|---|
| D-1 | 1 | —(CH$_2$)$_4$— | —CH$_2$—CHCH$_3$— | —OH |
| D-2 | 2 | —(CH$_2$)$_2$— | —CH$_2$—CHCH$_3$— | —OH |
| D-3 | 2 | —(CH$_2$)$_2$— | —(CH$_2$)$_6$— | —OH |
| D-4 | 3 | —(CH$_2$)$_2$— | —(CH$_2$)$_3$— | —OH |
| D-5 | 3 | —(CH$_2$)$_2$— | —(CH$_2$)$_8$— | —OH |
| D-6 | 3 | —(CH$_2$)$_2$— | —[(CH$_2$)$_2$O]$_2$—(CH$_2$)$_2$— | —OH |
| D-7 | 4 | —(CH$_2$)$_2$— | —CH$_2$—CHCH$_3$— | —OH |
| D-8 | 3 | —(CH$_2$)$_2$— | —(CH$_2$)$_2$— | —OH |
| D-9 | 3 | —(CH$_2$)$_2$— | —(CH$_2$)$_4$— | —OH |
| D-10 | 1 | —(CH$_2$)$_2$— | —CH$_2$— | —OH |
| D-12 | 1 | —(CH$_2$)$_2$— | —(CH$_2$)$_3$— | —NH$_2$ |
| D-13 | 2 | —(CH$_2$)$_2$— | —(CH$_2$)$_3$— | —NH$_2$ |
| D-14 | 3 | —(CH$_2$)$_2$— | —(CH$_2$)$_6$— | —NH$_2$ |

Synthesis of Amino Compound D-11

Tetraethylenepentamine (manufactured by Tokyo Chemical Industry Co., Ltd., 50.0 g (0.27 mol)) was caused to react with, in chloroform, 97.6 g (0.66 mol) of phthalic anhydride (manufactured by JFE Chemical Corporation), to obtain a compound in which the primary amines were protected with phthalimide groups. Subsequently, in acetonitrile, 150.3 g (1.06 mol) of iodomethane (manufactured by Tokyo Chemical Industry Co., Ltd.) was added and refluxed for 4 hours. Subsequently, the resultant compound was dissolved in 500 ml of ethanol; 30.0 g (0.60 mol) of hydrazine hydrate (manufactured by Wako Pure Chemical Industries, Ltd.) was added and refluxed for 5 hours, to obtain a compound from which the phthalimide groups had left. Subsequently, the solvent was driven off under a reduced pressure. The resultant compound was dissolved in 300 ml of ethanol; 79.4 g (2.65 mol) of p-formaldehyde was added and refluxed at the boiling point for 6 hours. Subsequently, the solvent was driven off under a reduced pressure. Separatory extraction and drying were performed to obtain Amino compound D-11 represented by the following Structural formula (11).

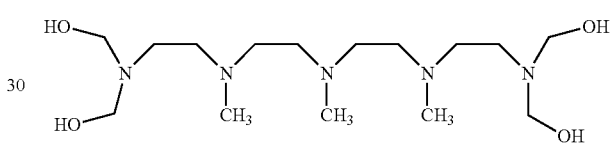

Structural formula (11)

Preparation of Amino Compounds D'-1 to D'-14

As Amino compounds D'-1 to D'-14, the following compounds were prepared. The structures of the compounds will be described with the following Structural formula (12) and Table 8. Incidentally, these compounds were all commercially available products (manufactured by Tokyo Chemical Industry Co., Ltd.):

D'-1: N-Methyldiethanolamine;

D'-2: N-Ethyldiethanolamine;

D'-3: N-Butyldiethanolamine;

D'-4: N-tert-Butyldiethanolamine;

D'-5: 3-(Dimethylamino)-1,2-propanediol;

D'-6: 3-(Diethylamino)-1,2-propanediol;

D'-7: N-Lauryldiethanolamine;

D'-8: Stearyldiethanolamine;

D'-9: 1-[Bis(2-hydroxyethyl)amino]-2-propanol;

D'-10: Bis(2-hydroxyethyl)aminotris(hydroxymethyl);

D'-11: 2,2'-Diamino-N-methyldiethylamine; D'-12: 3,3'-Diamino-N-methyldipropylamine;

D'-13: Tris(2-aminoethyl)amine; and

D'-14: Tris(3-aminopropyl)amine.

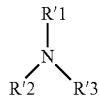

Structural formula (12)

TABLE 8

| No. | R'1 | R'2 | R'3 |
|---|---|---|---|
| D'-1 | —CH3 | —CH2—CH2—OH | —CH2—CH2—OH |
| D'-2 | —CH2—CH3 | —CH2—CH2—OH | —CH2—CH2—OH |
| D'-3 | —CH2—CH2—CH2—CH3 | —CH2—CH2—OH | —CH2—CH2—OH |
| D'-4 | —C(CH3)3 | —CH2—CH2—OH | —CH2—CH2—OH |
| D'-5 | —CH3 | —CH3 | —CH2—CH(OH)—CH2—OH |
| D'-6 | —CH2—CH3 | —CH2—CH3 | —CH2—CH(OH)—CH2—OH |
| D'-7 | —(CH2)11—CH3 | —CH2—CH2—OH | —CH2—CH2—OH |
| D'-8 | —(CH2)17—CH3 | —CH2—CH2—OH | —CH2—CH2—OH |
| D'-9 | —CH2—CH2—OH | —CH2—CH2—OH | —CH2—CH(OH)—CH3 |
| D'-10 | —C(CH2—OH)3 | —CH2—CH2—OH | —CH2—CH2—OH |
| D'-11 | —CH3 | —CH2—CH2—NH2 | —CH2—CH2—NH2 |
| D'-12 | —CH3 | —CH2—CH2—CH2—NH2 | —CH2—CH2—CH2—NH2 |
| D'-13 | —CH2—CH2—NH2 | —CH2—CH2—NH2 | —CH2—CH2—NH2 |
| D'-14 | —CH2—CH2—CH2—NH2 | —CH2—CH2—CH2—NH2 | —CH2—CH2—CH2—NH2 |

Preparation of Polyol

In addition to the above-described amino compounds, polyol compounds not having a carbonate bond in the following Table 9 were prepared.

TABLE 9

| No. | Trade name |
|---|---|
| D-15 | Trimethylolpropane (manufactured by Tokyo Chemical Industry Co., Ltd.) |
| D-16 | KURARAY POLYOL P-5010 (manufactured by KURARAY CO., LTD.) |
| D-17 | NIPPOLAN 4010 (manufactured by Tosoh Corporation) |
| D-18 | Dipentaerythritol (manufactured by Tokyo Chemical Industry Co., Ltd.) |
| D-19 | NIPPOLAN 982 (manufactured by Tosoh Corporation) |

Example 1

Hereinafter, a method for producing a developer carrying member according to the present disclosure will be described.

As materials for the surface layer, the following materials were mixed by stirring.

Reactive compound: Isocyanate-group-terminated prepolymer A-1: 84.8 parts by mass Amino compound: Amino compound D-1: 15.2 parts by mass Carbon black (trade name: MA-230, manufactured by Mitsubishi Chemical Corporation): 10.0 parts by mass Urethane resin fine particles (trade name: ART PEARL C-400, manufactured by Negami Chemical Industrial Co., Ltd.): 30.0 parts by mass Subsequently, methyl ethyl ketone was added such that the total solid content ratio became 30 mass %, and then mixing was performed with a sand mill. Furthermore, MEK was used to adjust the viscosity to 10 to 13 cps, to prepare a surface-layer-forming coating material.

The elastic roller K-1 produced above was immersed in the surface-layer-forming coating material, to form a coating film of the coating material on the surface of the elastic layer of the elastic roller K-1, and the coating film was dried. Furthermore, a heating treatment at a temperature of 160° C. for 1 hour was performed to thereby form a surface layer having a thickness of about 15 μm on the outer circumference of the elastic layer. Thus, a developer carrying member according to Example 1 was produced.

Examples 2 to 41

The same method as in Example 1 was performed except that, as the materials for the surface layer, materials described in the following Table 10 and Table 11 were used, to form surface-layer-forming coating materials. Such a coating material was applied to the elastic roller K-1, dried, and heated as in Example 1. Thus, developer carrying members according to Examples 2 to 41 were produced. In Example 23, in addition to the amino compound, polyol D-16 (KURARAY POLYOL P-5010) was added.

TABLE 10

| | Isocyanate-group-terminated prepolymer | | Amino compound or polyol | |
|---|---|---|---|---|
| | No. | Parts by mass | No. | Parts by mass |
| Example 1 | A-1 | 84.8 | D-1 | 15.2 |
| Example 2 | A-2 | 87.1 | D-2 | 12.9 |
| Example 3 | A-3 | 90.0 | D-2 | 10.0 |
| Example 4 | A-4 | 83.3 | D-3 | 16.7 |
| Example 5 | A-5 | 81.6 | D-4 | 18.4 |
| Example 6 | A-6 | 70.3 | D-5 | 29.7 |
| Example 7 | A-7 | 59.1 | D-6 | 40.9 |
| Example 8 | A-8 | 75.1 | D-7 | 24.9 |
| Example 9 | A-9 | 71.0 | D-7 | 29.0 |
| Example 10 | A-10 | 75.1 | D-2 | 24.9 |
| Example 11 | A-11 | 92.1 | D-2 | 7.9 |
| Example 12 | A-12 | 67.9 | D-3 | 32.1 |
| Example 13 | A-13 | 85.1 | D-3 | 14.9 |
| Example 14 | A-14 | 79.0 | D-8 | 21.0 |
| Example 15 | A-15 | 86.9 | D-4 | 13.1 |
| Example 16 | A-16 | 85.5 | D-9 | 14.5 |
| Example 17 | A-17 | 75.0 | D-7 | 25.0 |
| Example 18 | A-18 | 71.0 | D-7 | 29.0 |
| Example 19 | A-19 | 92.4 | D-2 | 7.6 |
| Example 20 | A-20 | 90.5 | D-10 | 9.5 |
| Example 21 | A-21 | 77.0 | D-2 | 23.0 |
| Example 22 | A-22 | 84.9 | D-11 | 15.1 |
| Example 23 | A-19 | 42.1 | D-2 | 3.2 |
| | | | D-16 | 54.7 |
| Example 24 | A-1 | 88.0 | D-12 | 12.0 |
| Example 25 | A-1 | 82.0 | D-2 | 18.0 |
| Example 26 | A-1 | 70.1 | D-13 | 29.9 |
| Example 27 | A-23 | 75.1 | D-13 | 24.9 |

TABLE 11

|  | Isocyanate-terminated prepolymer | | Amino compound or polyol | |
| --- | --- | --- | --- | --- |
|  | No. | Parts by mass | No. | Parts by mass |
| Example 28 | A-3 | 93.3 | D'-1 | 6.7 |
| Example 29 | A-3 | 92.6 | D'-2 | 7.4 |
| Example 30 | A-3 | 91.1 | D'-3 | 8.9 |
| Example 31 | A-3 | 91.1 | D'-4 | 8.9 |
| Example 32 | A-3 | 93.3 | D'-5 | 6.7 |
| Example 33 | A-3 | 91.8 | D'-6 | 8.2 |
| Example 34 | A-3 | 85.8 | D'-7 | 14.2 |
| Example 35 | A-3 | 82.2 | D'-8 | 17.8 |
| Example 36 | A-3 | 93.8 | D'-9 | 6.2 |
| Example 37 | A-3 | 95.2 | D'-10 | 4.8 |
| Example 38 | A-3 | 93.4 | D'-11 | 6.6 |
| Example 39 | A-3 | 91.9 | D'-12 | 8.1 |
| Example 40 | A-3 | 94.4 | D'-13 | 5.6 |
| Example 41 | A-3 | 93.0 | D'-14 | 7.0 |

Comparative Example 1

As materials for the surface layer, to 7.2 parts by mass of Polyol D-15, 92.8 parts by mass of Isocyanate-group-terminated prepolymer A-19, 10.0 parts by mass of carbon black (trade name: MA-230, manufactured by Mitsubishi Chemical Corporation), and 30.0 parts by mass of urethane resin fine particles (trade name: ART PEARL C-400; manufactured by Negami Chemical Industrial Co., Ltd.) were mixed by stirring.

Subsequently, the same method as in preparation of the surface-layer-forming coating material according to Example 1 was performed to prepare a surface-layer-forming coating material according to Comparative Example 1. As in Example 1, this surface-layer-forming coating material was applied to the surface of the silicone rubber elastic layer of the elastic roller K-1, and dried to form a surface layer. Thus, a developer carrying member of Comparative Example 1 was produced.

Comparative Examples 2 to 8

The same method as in Comparative Example 1 was performed except that, as the materials for the surface layer, materials described in the following Table 12 were used, to form surface-layer-forming coating materials. As in Comparative Example 1, such a coating material was applied to the elastic roller, dried, and heated. Thus, developer carrying members according to Comparative Examples 2 to 8 were produced. Incidentally, in Comparative Example 6, instead of the polyol, Amino compound D-2 was used.

TABLE 12

|  | Isocyanate-group-terminated prepolymer | | Amino compound or polyol | |
| --- | --- | --- | --- | --- |
|  | No. | Parts by mass | No. | Parts by mass |
| Comparative Example 1 | A-19 | 92.8 | D-15 | 7.2 |
| Comparative Example 2 | A-24 | 31.1 | D-16 | 68.9 |
| Comparative Example 3 | A-19 | 36.4 | D-17 | 63.6 |
| Comparative Example 4 | A-19 | 93.1 | D-18 | 6.9 |
| Comparative Example 5 | A-19 | 36.4 | D-19 | 63.6 |
| Comparative Example 6 | A-25 | 87.9 | D-2 | 12.1 |
| Comparative Example 7 | A-25 | 92.8 | D-15 | 7.2 |
| Comparative Example 8 | A-25 | 93.1 | D-18 | 6.9 |

Each of the surface layers obtained in Examples was analyzed with a pyrolyzer (trade name: Pyrofoil sampler JPS-700, manufactured by Japan Analytical Industry Co., Ltd.) and a GC/MS apparatus (trade name: Focus GC/ISQ, manufactured by Thermo Fisher Scientific Inc.), at a pyrolysis temperature of 590° C., with a carrier gas that was helium. As a result, the obtained fragment peaks have demonstrated that the surface layers have a structure represented by Structural formula (1).

In each of the surface layers obtained in Examples, the carbonate-bond concentration of the urethane resin was determined in the following manner.

Elemental analysis is first performed to determine the carbon atom content of the urethane resin.

Subsequently, narrow scan analysis of X-ray photoelectron spectroscopy (XPS) is performed, to analyze the ratio of carbonate bonds to bonds of C1s. From the results of elemental analysis and XPS, the carbonate-bond concentration of the urethane resin was calculated.

In each of the surface layers obtained in Examples, the concentration of the nitrogen atom of a tertiary amine derived from an amino compound in the urethane resin was determined from the measured value obtained with the pyrolysis GC/MS.

The developer carrying members according to Examples 1 to 41 and Comparative Examples 1 to 8 were evaluated for the following items. The results of Examples will be described in Table 13 and Table 14. The evaluation results of Comparative Examples will be described in Table 15.

Incidentally, the carbonate-bond concentration (mass %) of the urethane resin can also be calculated from the carbonate-bond concentration (mass %) of the isocyanate-group-terminated prepolymer in Table 5 and a mixing ratio to the amino compound described in Table 10 to Table 12.

Triboelectric Amount of Developer Carrying Member

The triboelectric amount of such a developer carrying member was measured, after being left in an environment at a temperature of 32.5° C. and a relative humidity of 85% (hereafter H/H) for 12 hours or more, in the H/H environment in accordance with the following procedures.

Figure 4:
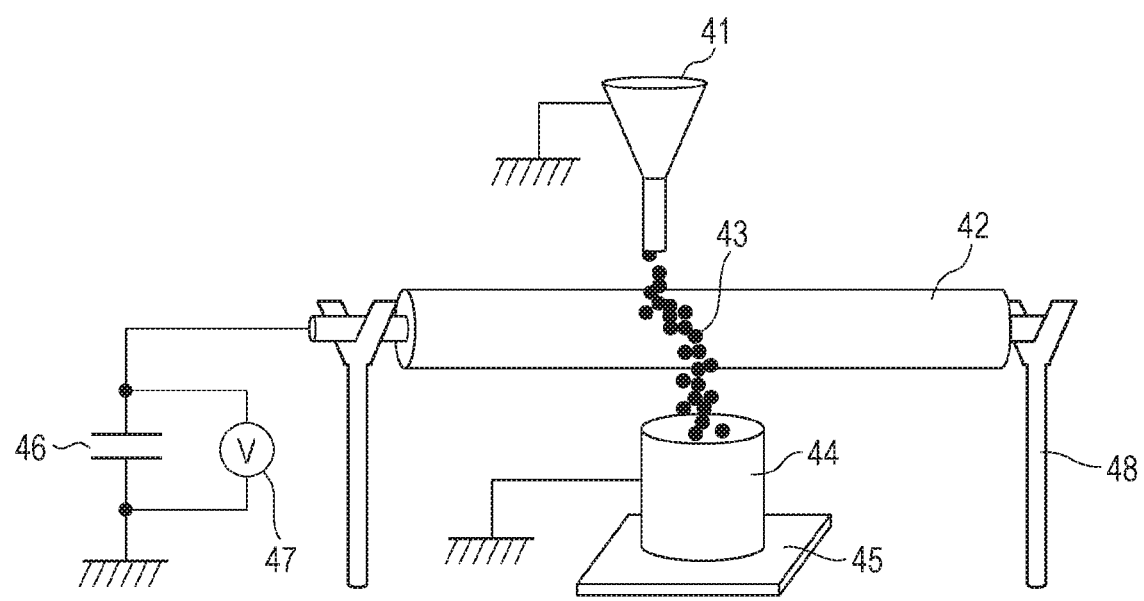
FIG. 4 is a schematic configuration view of a measurement instrument for measuring a triboelectric amount of a developer carrying member according to the present disclosure.

The measurement was performed with a measurement unit illustrated in FIG. 4 and connected to a cascade-type surface-charging-amount measurement apparatus TS-100AT (trade name, manufactured by KYOCERA Chemical Corporation). As illustrated in FIG. 4, a developer carrying member 42 was placed and fixed on insulating support bars 48 so as not to be rotated. Carriers 43 were introduced into a powder inlet 41, and allowed to drop for 10 seconds, so that the carriers 43 were electrically charged due to contact. The carriers employed were Standard carriers N-01 (The Imaging Society of Japan). The total charging amount of the carriers 43 having dropped into a pan 44 disposed on an insulating plate 45 was measured, with an electrometer 47 parallel-connected to a capacitor 46, as charging amount Q [μC]. In addition, the mass (g) of carriers having dropped into the pan 44 was measured. From these values, charging amount per unit mass Q/M (μC/g) was determined as triboelectric amount.

Evaluation of Charge of Talc

The phenomenon in which a developer carrying member causes leakage of charges of excessively charged talc to achieve decay in the charges of talc was evaluated in the following manner. From a laser-printer cartridge 17A (manufactured by Hewlett-Packard Company), the toner was removed and the cartridge was filled with 100 g of a talc powder (manufactured by NIPPON TALC Co., Ltd., trade name: SG-95). Furthermore, the developer carrying member of the cartridge was replaced by a developer carrying member according to an Example. Subsequently, the cartridge was loaded into a laser printer (trade name: HP LaserJet Pro M102w Printer, manufactured by Hewlett-Packard Company). Subsequently, the laser printer was placed in the H/H environment and left to stand for 12 hours or more. In the H/H environment, the cartridge was used for idle running in the laser printer for 3 minutes without printing on paper. Immediately after the idle running was complete, the cartridge was taken out, and a high-precision surface potentiometer (trade name: Surface potentiometer MODEL 344, manufactured by TREK, INC.) was used to measure the surface potential of the talc-coated developer carrying member (talc charge decay (V)). Thus, when decay in the charges of talc is achieved with the developer carrying member (in the case of rapid decay of the charges of talc), the absolute value of the surface potential is measured to be small; when the decay is not achieved (in the case of slow decay in the charges of talc), the absolute value of the surface potential is measured to be large.

Evaluation of Image for Talc Derived Fogging

A developer carrying member as an evaluation target was loaded into a laser printer (trade name: HP LaserJet Pro M102w Printer, manufactured by Hewlett-Packard Company), and evaluation for talc derived fogging was performed. The laser printer in which the developer carrying member as an evaluation target was loaded was placed in the H/H environment and left to stand for 12 hours or more. Subsequently, 1000 black images having a coverage rate of 1% were continuously printed on a predetermined number of talc-containing paper sheets (trade name, Century Star paper, manufactured by CENTURY PULP AND PAPER). In this case, the edge of the 1000th image was measured for reflectance using a reflection density meter (trade name: TC-6DS/A, manufactured by Tokyo Denshoku co., Ltd.). A decrease (%) in the reflectance relative to non-printed paper was measured. This value was defined as the index of talc derived fogging.

TABLE 13

| | Isocyanate-group-terminated prepolymer | | | | | | Tertiary amine nitrogen concentration (mass %) | Evaluation results | | |
|---|---|---|---|---|---|---|---|---|---|---|
| | | Structural formula included No. | Structures contained in molecule | Copolymerization ratio | Amino compound or polyol No. | Functional group | Carbonate-bond concentration (mass %) | Triboelectric amount (Q/M) | Talc charge decay (V) | Talc paper fogging (%) |
| Example 1 | A-1 | (5) | R41 = —(CH$_2$)$_6$— | R42 = —(CH$_2$)$_5$— | p/k = 1.65 | D-1 | —OH | 17.5 | 1.3 | −4.8 | −1.2 | 1.1 |
| Example 2 | A-2 | (5) | R41 = —(CH$_2$)$_6$— | R42 = —(CH$_2$)$_5$— | p/k = 1.65 | D-2 | —OH | 17.2 | 1.4 | −4.3 | −1.2 | 1.0 |
| Example 3 | A-3 | (5) | R41 = —(CH$_2$)$_6$— | R42 = —(CH$_2$)$_5$— | p/k = 1.65 | D-2 | —OH | 19.9 | 1.1 | −4.3 | −1.1 | 1.2 |
| Example 4 | A-4 | (5) | R41 = —(CH$_2$)$_6$— | R42 = —(CH$_2$)$_5$— | p/k = 1.65 | D-3 | —OH | 18.8 | 1.2 | −3.9 | −1.1 | 1.0 |
| Example 5 | A-5 | (5) | R41 = —(CH$_2$)$_3$— | R42 = —(CH$_2$)$_8$— | p/k = 1.55 | D-4 | —OH | 19.9 | 2.1 | −5.3 | −0.9 | 1.1 |
| Example 6 | A-6 | (5) | R41 = —(CH$_2$)$_4$— | R42 = —(CH$_2$)$_6$— | p/k = 1.9 | D-5 | —OH | 18.9 | 1.8 | −4.4 | −2.5 | 2.8 |
| Example 7 | A-7 | (5) | R41 = —(CH$_2$)$_3$— | R42 = —(CH$_2$)$_8$— | p/k = 2.2 | D-6 | —OH | 15.7 | 2.4 | −5.7 | −2.4 | 2.8 |
| Example 8 | A-8 | (5) | R41 = —(CH$_2$)$_4$— | R42 = —(CH$_2$)$_6$— | p/k = 1.4 | D-7 | —OH | 16.7 | 2.9 | −6.5 | −1.3 | 1.6 |
| Example 9 | A-9 | (4) | R31 = —(CH$_2$)$_6$— | — | — | D-7 | —OH | 19.8 | 3.4 | −7.2 | −4.4 | 5.6 |
| Example 10 | A-10 | (4) | R31 = —(CH$_2$)$_6$— | — | — | D-2 | —OH | 19.3 | 2.7 | −6.7 | −3.5 | 3.1 |
| Example 11 | A-11 | (4) | R31 = —(CH$_2$)$_6$— | — | — | D-2 | —OH | 22.8 | 0.8 | −3.1 | −4.4 | 5.8 |
| Example 12 | A-12 | (4) | R31 = —(CH$_2$)$_6$— | — | — | D-3 | —OH | 12.6 | 2.2 | −5.1 | −6.2 | 5.6 |
| Example 13 | A-13 | (4) | R31 = —(CH$_2$)$_6$— | — | — | D-3 | —OH | 26.7 | 1.0 | −4.2 | −1.8 | 5.4 |
| Example 14 | A-14 | (7) | R61 = —(CH$_2$)$_6$— | R62 = —(CH$_2$)$_5$— | r/s = 1.00 | D-8 | —OH | 22.8 | 2.9 | −6.1 | −4.1 | 3.1 |
| Example 15 | A-15 | (4) | R31 = —CH$_2$—⟨⟩—CH$_2$— | — | — | D-4 | —OH | 19.1 | 1.5 | −4.6 | −4.2 | 3.5 |
| Example 16 | A-16 | (7) | R61 = —(CH$_2$)$_2$—CHCH$_3$—(CH$_2$)$_2$— | R62 = —(CH$_2$)$_6$— | r/s = 9.00 | D-9 | —OH | 22.0 | 1.4 | −4.3 | −3.7 | 3.2 |
| Example 17 | A-17 | (7) | R61 = —(CH$_2$)$_2$—CHCH$_3$—(CH$_2$)$_2$— | R62 = —(CH$_2$)$_6$— | r/s = 9.00 | D-7 | —OH | 22.1 | 2.9 | −6.2 | −4.1 | 3.1 |

TABLE 13-continued

| | | Isocyanate-group-terminated prepolymer | | | | Amino compound or polyol | | Carbonate-bond concentration (mass %) | Tertiary amine nitrogen concentration (mass %) | Evaluation results | | |
|---|---|---|---|---|---|---|---|---|---|---|---|---|
| | No. | Structural formula included | Structures contained in molecule | | Copolymerization ratio | No. | Functional group | | | Triboelectric amount (Q/M) | Talc charge decay (V) | Talc paper fogging (%) |
| Example 18 | A-18 | (5) | R41 = —(CH$_2$)$_6$— | R42 = —(CH$_2$)$_5$— | p/k = 1.65 | D-7 | —OH | 16.2 | 3.4 | −7.4 | −1.2 | 2.5 |
| Example 19 | A-19 | (5) | R41 = —(CH$_2$)$_6$— | R42 = —(CH$_2$)$_5$— | p/k = 1.65 | D-2 | —OH | 19.1 | 0.8 | −3.0 | −1.1 | 2.7 |
| Example 20 | A-20 | (5) | R41 = —(CH$_2$)$_3$— | R42 = —(CH$_2$)$_3$— | p/k = 1.75 | D-10 | —OH | 27.5 | 1.5 | −4.4 | −0.4 | 2.6 |
| Example 21 | A-21 | (5) | R41 = —(CH$_2$)$_8$— | R42 = —(CH$_2$)$_8$— | p/k = 1.45 | D-2 | —OH | 12.6 | 2.5 | −6.1 | −3.3 | 2.5 |
| Example 22 | A-22 | (5) | R41 = —(CH$_2$)$_3$— | R42 = —(CH$_2$)$_3$— | p/k = 1.75 | D-11 | —OH | 25.8 | 3.4 | −7.7 | −1.8 | 4.5 |
| Example 23 | A-19 | (5) | R41 = —(CH$_2$)$_6$— | R42 = —(CH$_2$)$_5$— | p/k = 1.65 | D-2 / D-16 | —OH / —OH | 13.8 | 0.7 | −3.0 | −4.6 | 4.4 |
| Example 24 | A-1 | (5) | R41 = —(CH$_2$)$_6$— | R42 = —(CH$_2$)$_5$— | p/k = 1.65 | D-12 | —NH$_2$ | 18.2 | 1.1 | −4.0 | −1.6 | 2.7 |
| Example 25 | A-1 | (5) | R41 = —(CH$_2$)$_6$— | R42 = —(CH$_2$)$_5$— | p/k = 1.65 | D-13 | —NH$_2$ | 16.9 | 1.9 | −4.2 | −1.8 | 2.7 |
| Example 26 | A-1 | (5) | R41 = —(CH$_2$)$_6$— | R42 = —(CH$_2$)$_5$— | p/k = 1.65 | D-14 | —NH$_2$ | 14.5 | 1.8 | −4.1 | −1.9 | 2.6 |
| Example 27 | A-23 | (8) | R71 = —CH$_2$—⟨C$_6$H$_4$⟩—CH$_2$— | R72 = —(CH$_2$)$_5$— | x/y = 1.65 | D-14 | —NH$_2$ | 16.3 | 1.5 | −4.5 | −2.6 | 7.1 |

TABLE 14

| | | Isocyanate-group-terminated prepolymer | | | Amino compound or polyol | | Carbonate-bond concentration (mass %) | Tertiary amine nitrogen concentration (mass %) | Evaluation results | | |
|---|---|---|---|---|---|---|---|---|---|---|---|
| | No. | Structural formula included | Structures contained in molecule | Copolymerization ratio | No. | Functional group | | | Triboelectric amount (Q/M) | Talc charge decay (V) | Talc paper fogging (%) |
| Example 28 | A-3 | (5) | R41 = —(CH$_2$)$_6$— R42 = —(CH$_2$)$_5$— | p/k = 1.65 | D'-1 | —OH | 23.1 | 3.1 | −2.8 | −2.3 | 7.9 |
| Example 29 | A-3 | (5) | R41 = —(CH$_2$)$_6$— R42 = —(CH$_2$)$_5$— | p/k = 1.65 | D'-2 | —OH | 22.4 | 3.3 | −2.9 | −2.6 | 7.7 |
| Example 30 | A-3 | (5) | R41 = —(CH$_2$)$_6$— R42 = —(CH$_2$)$_5$— | p/k = 1.65 | D'-3 | —OH | 23.2 | 3.0 | −2.7 | −2.4 | 7.8 |
| Example 31 | A-3 | (5) | R41 = —(CH$_2$)$_6$— R42 = —(CH$_2$)$_5$— | p/k = 1.65 | D'-4 | —OH | 23.2 | 3.0 | −2.6 | −2.3 | 7.6 |
| Example 32 | A-3 | (5) | R41 = —(CH$_2$)$_6$— R42 = —(CH$_2$)$_5$— | p/k = 1.65 | D'-5 | —OH | 23.1 | 3.0 | −2.7 | −2.4 | 7.8 |
| Example 33 | A-3 | (5) | R41 = —(CH$_2$)$_6$— R42 = —(CH$_2$)$_5$— | p/k = 1.65 | D'-6 | —OH | 23.1 | 2.9 | −2.6 | −2.3 | 7.8 |
| Example 34 | A-3 | (5) | R41 = —(CH$_2$)$_6$— R42 = —(CH$_2$)$_5$— | p/k = 1.65 | D'-7 | —OH | 20.3 | 3.9 | −2.9 | −3.3 | 7.2 |
| Example 35 | A-3 | (5) | R41 = —(CH$_2$)$_6$— R42 = —(CH$_2$)$_5$— | p/k = 1.65 | D'-8 | —OH | 21.9 | 3.3 | −2.9 | −2.6 | 7.7 |
| Example 36 | A-3 | (5) | R41 = —(CH$_2$)$_6$— R42 = —(CH$_2$)$_5$— | p/k = 1.65 | D'-9 | —OH | 22.8 | 3.0 | −2.7 | −2.4 | 7.7 |
| Example 37 | A-3 | (5) | R41 = —(CH$_2$)$_6$— R42 = —(CH$_2$)$_5$— | p/k = 1.65 | D'-10 | —NH$_2$ | 24.3 | 2.4 | −2.6 | −1.8 | 7.1 |
| Example 38 | A-3 | (5) | R41 = —(CH$_2$)$_6$— R42 = —(CH$_2$)$_5$— | p/k = 1.65 | D'-11 | —NH$_2$ | 22.3 | 3.1 | −2.7 | −2.4 | 7.7 |
| Example 39 | A-3 | (5) | R41 = —(CH$_2$)$_6$— R42 = —(CH$_2$)$_5$— | p/k = 1.65 | D'-12 | —NH$_2$ | 22.9 | 2.9 | −2.6 | −2.3 | 7.8 |
| Example 40 | A-3 | (5) | R41 = —(CH$_2$)$_6$— R42 = —(CH$_2$)$_5$— | p/k = 1.65 | D'-13 | —NH$_2$ | 23.5 | 2.7 | −2.5 | −2.0 | 7.2 |
| Example 41 | A-3 | (5) | R41 = —(CH$_2$)$_6$— R42 = —(CH$_2$)$_5$— | p/k = 1.65 | D'-14 | —NH$_2$ | 22.8 | 2.9 | −2.6 | −2.2 | 7.2 |

TABLE 15

| | Isocyanate-group-terminated prepolymer | | | Amino compound or polyol | | Carbonate-bond concentration (mass %) | Tertiary amine nitrogen concentration (mass %) | Evaluation results | | |
|---|---|---|---|---|---|---|---|---|---|---|
| | No. | Structural formula included | Structures contained in molecule | Copolymerization ratio | No. | Functional group | | | Triboelectric amount (Q/M) | Talc charge decay (V) | Talc paper fogging (%) |
| Comparative Example 1 | A-19 | (5) | R41 = —(CH$_2$)$_6$— R42 = —(CH$_2$)$_5$— p/k = 1.65 | D-15 | —OH | 19.1 | 0.0 | −1.8 | −1.5 | 11.7 |
| Comparative Example 2 | A-24 | (5) | R41 = —(CH$_2$)$_6$— R42 = —(CH$_2$)$_5$— p/k = 1.65 | D-16 | —OH | 7.0 | 0.0 | −1.9 | −3.5 | 12.7 |
| Comparative Example 3 | A-19 | (5) | R41 = —(CH$_2$)$_6$— R42 = —(CH$_2$)$_5$— p/k = 1.65 | D-17 | —OH | 7.5 | 0.0 | −1.9 | −2.7 | 10.4 |
| Comparative Example 4 | A-19 | (5) | R41 = —(CH$_2$)$_6$— R42 = —(CH$_2$)$_5$— p/k = 1.65 | D-18 | —OH | 19.2 | 0.0 | −1.8 | −2.9 | 14.1 |
| Comparative Example 5 | A-19 | (5) | R41 = —(CH$_2$)$_6$— R42 = —(CH$_2$)$_5$— p/k = 1.65 | D-19 | —OH | 7.5 | 0.0 | −1.6 | −6.2 | 17.6 |
| Comparative Example 6 | A-25 | (9) | R81 = —(CH$_2$)$_4$— — — | D-2 | —OH | 0.0 | 1.3 | −2.9 | −17.7 | 19.0 |
| Comparative Example 7 | A-25 | (9) | R81 = —(CH$_2$)$_4$— — — | D-15 | —OH | 0.0 | 0.0 | −1.9 | −14.3 | 20.7 |
| Comparative Example 8 | A-25 | (9) | R81 = —(CH$_2$)$_4$— — — | D-18 | —OH | 0.0 | 0.0 | −1.6 | −17.8 | 17.9 |

In Examples 1 to 41, the surface layers contain urethane resins according to the present disclosure, so that triboelectric amounts are large and talc charge decay rapidly occurs (low talc charge decay (V)). Thus, the effect of preventing talc derived fogging was markedly provided.

In particular, in Examples 1 to 27, the moiety represented by Structural formula (2) is included, so that the following tendency has been demonstrated: the effect of preventing talc derived fogging and the capability of imparting appropriate triboelectricity were markedly satisfied, and higher anti-talc derived fogging performance is provided. Incidentally, in Examples 1 to 26, the alkyl groups are adjacent to the carbonate bonds and the effect of preventing talc derived fogging is particularly markedly provided, compared with Example 27 in which the aromatic is adjacent to the carbonate bond.

Among Examples 9 to 17 in which a structure including a polyester bond is not added to the structure including a carbonate bond, Examples 10 and 14 to 17, in which the carbonate-bond concentration of the urethane resin is 14.0 mass % or more and 23.0 mass % or less and the concentration of the nitrogen atom of a tertiary amine derived from a compound represented by Structural formula (2) is 1.0% mass % or more and 3.0 mass % or less, provide particularly markedly the effect of preventing talc derived fogging.

In Examples 1 to 8 and Examples 24 to 26, in the urethane resin, the structure represented by Structural formula (5) is disposed between two adjacent urethane bonds. Thus, the effect of preventing talc derived fogging is particularly markedly provided.

In Examples 1 to 5, Example 8, and Examples 24 to 26, in Structural formula (5), p and k are in the range of 1.4 to 1.8. Thus, the effect of preventing talc derived fogging is particularly markedly provided.

In particular, in Examples 1 to 5 and Example 8, the compound represented by Structural formula (2) is the compound represented by Structural formula (6). Thus, the effect of preventing talc derived fogging is particularly markedly provided.

In Comparative Examples 6 to 8, in the surface layers, the urethane resins do not have a carbonate bond in the molecules thereof. Thus, the absolute values of talc charge decay are large (slow talc charge decay), which results in serious talc derived fogging.

In Comparative Examples 1 to 5, in the surface layers, the urethane resins contain either a carbonate bond or a tertiary amino structure. Thus, the triboelectric amounts are small, which results in serious talc derived fogging.

The present disclosure provides a developer carrying member including a surface layer including a urethane resin having a specific moiety, so that, even in the case of continuous printing on recording paper having a high talc content, talc derived fogging does not occur, and contribution to formation of images of high quality is achieved.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The invention claimed is:

1. A developer carrying member comprising a base member and a surface layer,
   wherein the surface layer includes a urethane resin, and the urethane resin has a carbonate bond and includes a tertiary amine structure.

2. The developer carrying member according to claim 1, wherein the urethane resin has a moiety represented by Structural formula (1):

Structural formula (1)

[in Structural formula (1), R1 represents a linear or branched alkylene group having 2 or more and 4 or less carbon atoms, n is an integer of 0 or more and 4 or less; when n is 2 or more and 4 or less, a plurality of R1 are each independently defined as above, when n is 0, symbols "*1", "*2", and "*3" each independently represent a bonding point for a linear or branched alkyl group having 1 to 4 carbon atoms, or a bonding point for a polymer chain of the urethane resin, when n is 1 or more and 4 or less, symbols "*1", "*2", "*3", and "*4" each independently represent a bonding point for a hydrogen atom, a bonding point for a linear or branched alkyl group having 1 to 4 carbon atoms, or a bonding point for the polymer chain of the urethane resin; when n is 2 or more and 4 or less, a plurality of "*4" are each independently defined as above, provided that, when n is 1, "*1", "*2", "*3", and "*4" are all bonding points for the polymer chain of the urethane resin, and when n is 2 or more and 4 or less, at least four selected from "*1", "*2", "*3", and a plurality of "*4" are bonding points for the polymer chain of the urethane resin].

3. The developer carrying member according to claim 1, further comprising an elastic layer between the base member and the surface layer.

4. The developer carrying member according to claim 1, wherein, in the urethane resin, a concentration of the carbonate bond is 14.0 mass % or more and 23.0 mass % or less, and, in the urethane resin, a concentration of a nitrogen atom of tertiary amine is 1.0 mass % or more and 3.0 mass % or less.

5. The developer carrying member according to claim 1, wherein the urethane resin includes a structure represented by Structural formula (4) below and including a carbonate bond:

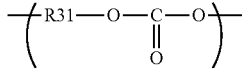

Structural formula (4)

[in Structural formula (4), R31 is a linear or branched alkylene group having 3 or more and 8 or less carbon atoms or an alkylene group having 4 or more and 8 or less carbon atoms and including a cyclic hydrocarbon structure having 4 or more and 6 or less carbon atoms].

6. The developer carrying member according to claim 1, wherein the urethane resin has, between two adjacent urethane bonds, a structure represented by Structural formula (5):

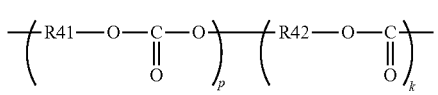

Structural formula (5)

[in Structural formula (5), R41 represents a linear or branched alkylene group having 3 or more and 8 or less carbon atoms, or an alkylene group having 4 or more and 8 or less carbon atoms and including a cyclic hydrocarbon structure having 4 or more and 6 or less carbon atoms, R42 represents a linear or branched alkylene group having 3 or more and 8 or less carbon atoms, p is an integer of 1 or more, k is an integer of 1 or more; when p and k are 2 or more, a plurality of R41 and a plurality of R42 are each independently defined as above].

7. The developer carrying member according to claim 6, wherein p and k in Structural formula (5) above satisfy a relation represented by Formula (I) below:

$$1.4 \le p/k \le 1.8$$ Formula (I).

8. A developer carrying member comprising a base member, an elastic layer on the base member, and a surface layer on the elastic layer, wherein the surface layer includes a urethane resin, the urethane resin has a carbonate bond in a molecule thereof, and has a moiety derived from a reaction between a compound represented by Structural formula (2) below and polyisocyanate:

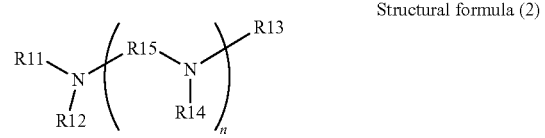

Structural formula (2)

[In Structural formula (2), R15 represents a linear or branched alkylene group having 2 or more and 4 or less carbon atoms, n is an integer of 0 or more and 4 or less; when n is 2 or more and 4 or less, a plurality of R15 are each independently defined as above, when n is 0, R11 to R13 are each independently selected from (a2), (b), (c), and (d) below, R11 to R14 in a case where n is 1 and R11 to R13 and a plurality of R14 in a case where n is 2 or more and 4 or less are each independently selected from (a1), (a2), (b), (c), and (d) below, provided that, when n is 1, R11 to R14 are each selected from (b) to (d) below, when n is 2 or more and 4 or less, at least four of R11 to R13 and two to four R14 are selected from (b) to (d) below:

(a1) a hydrogen atom
(a2) a linear or branched alkyl group having 1 to 4 carbon atoms;
(b) a linear or branched hydroxyalkyl group having 1 or more and 8 or less carbon atoms;
(c) a linear or branched aminoalkyl group having 2 or more and 8 or less carbon atoms; and
(d) a group represented by Structural formula (3) below:

Structural formula (3)

[in Structural formula (3), m is 2 or 3, and a plurality of R21 each independently represent a linear or branched alkylene group having 2 or more and 5 or less carbon atoms]].

9. The developer carrying member according to claim 8, wherein the compound represented by Structural formula (2) above is a compound represented by Structural formula (6) below:

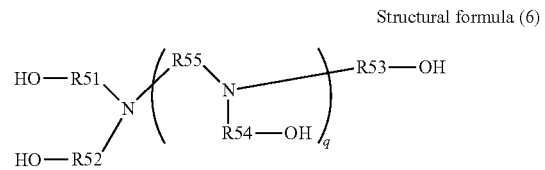

Structural formula (6)

[in Structural formula (6), R55 represents a linear or branched alkylene group having 2 or more and 4 or less carbon atoms, q is an integer of 0 or more and 4 or less; when q is 2 or more and 4 or less, a plurality of R55 are each independently defined as above; R51 to R54 each independently represent a linear or branched alkylene group having 2 or more and 5 or less carbon atoms; when q is 2 or more and 4 or less, a plurality of R54 are each independently defined as above].

10. A process cartridge configured to be detachably attached to a main body of an electrophotographic apparatus, the process cartridge at least comprising:
   a toner container including toner, and a developer carrying member conveying the toner, wherein the developer carrying member comprises a base member and a surface layer,
   wherein the surface layer includes a urethane resin, and
   the urethane resin has a carbonate bond and includes a tertiary amine structure.

11. An electrophotographic apparatus at least comprising:
   an electrophotographic photoconductor;
   a charging member disposed so as to be configured to charge the electrophotographic photoconductor; and
   a developer carrying member supplying toner to the electrophotographic photoconductor,
   wherein the developer carrying member comprises a base member and a surface layer,
   wherein the surface layer includes a urethane resin, and
   the urethane resin has a carbonate bond and includes a tertiary amine structure.

12. The electrophotographic apparatus according to claim 11, wherein the developer carrying member is disposed in contact with the electrophotographic photoconductor.

13. The electrophotographic apparatus according to claim 12, wherein the developer carrying member further comprises an elastic layer between the base member and the surface layer.

* * * * *